(12) United States Patent
Yang et al.

(10) Patent No.: US 12,380,199 B2
(45) Date of Patent: Aug. 5, 2025

(54) EXECUTING SERVICES ACROSS MULTIPLE TRUSTED DOMAINS FOR DATA ANALYSIS

(71) Applicant: Promethium, Inc., Menlo Park, CA (US)

(72) Inventors: Shuo Yang, Fremont, CA (US);
Xicheng Chang, Menlo Park, CA (US);
Himangshu Das, San Jose, CA (US);
Azary Smotrich, Reno, NV (US);
Puneet Gupta, Fremont, CA (US);
Kaycee Kuan-Cheng Lai, San Carlos, CA (US)

(73) Assignee: Promethium, Inc., Menlo Park, CA (US)

( * ) Notice: Subject to any disclaimer, the term of this patent is extended or adjusted under 35 U.S.C. 154(b) by 370 days.

(21) Appl. No.: 17/829,895

(22) Filed: Jun. 1, 2022

(65) Prior Publication Data

US 2022/0382791 A1    Dec. 1, 2022

Related U.S. Application Data

(60) Provisional application No. 63/195,616, filed on Jun. 1, 2021.

(51) Int. Cl.
*G06F 17/00*    (2019.01)
*G06F 16/31*    (2019.01)
(Continued)

(52) U.S. Cl.
CPC ............ *G06F 21/44* (2013.01); *G06F 16/313* (2019.01); *G06F 16/3329* (2019.01);
(Continued)

(58) Field of Classification Search
CPC .. G06F 40/30; G06F 16/9035; G06F 16/2455; G06F 21/6245; G06F 16/313;
(Continued)

(56) References Cited

U.S. PATENT DOCUMENTS 5,933,822 A    8/1999    Braden-Harder et al.
5,953,716 A    9/1999    Madnick et al.
(Continued)

OTHER PUBLICATIONS

International Preliminary Examination Report (IPPR Chapter II), Patent Cooperation Treaty Application No. PCT/US2020/024003, Apr. 20, 2021, sixteen pages.
(Continued)

*Primary Examiner* — Michael Ortiz-Sanchez
(74) *Attorney, Agent, or Firm* — Fenwick & West LLP

(57) ABSTRACT

Computing systems of a multi-tenant trusted domain collect metadata describing data stored in data sources of a set of tenant trusted domains. The computing systems of the multi-tenant trusted domain use the metadata to process natural language questions based on data stored in data sources of a tenant trusted domain. The computing systems of the multi-tenant trusted domain identify a set of data sources of the tenant trusted domain that are relevant for processing the natural language question and generate an execution plan for answering the natural language question. The computing systems of the multi-tenant trusted domain send the execution plan to one or more computing systems of the tenant trusted domain. The computing systems of the tenant trusted domain execute the execution plan and send the result of executing the execution plan to a client device that sent the natural language question.

20 Claims, 14 Drawing Sheets

(51) Int. Cl.
   *G06F 16/3329*  (2025.01)
   *G06F 16/3332*  (2025.01)
   *G06F 16/951*   (2019.01)
   *G06F 21/44*    (2013.01)
   *G06F 40/20*    (2020.01)

(52) U.S. Cl.
   CPC ........ *G06F 16/3335* (2019.01); *G06F 16/951* (2019.01); *G06F 40/20* (2020.01)

(58) Field of Classification Search
   CPC ........ G06F 16/31; G06F 16/33; G06F 16/335; G06F 16/3349; G06F 16/334; G06F 16/3331; G06F 16/332; G06F 16/3335; G06F 16/3329; G06F 16/951; G06F 16/95; G06F 16/953; G06F 16/972; G06F 40/20; G06F 40/205; G06F 40/279; G06F 21/44; G06F 21/00; G06F 21/30; G06F 16/5846; G06F 9/453; G06F 16/903; G06F 16/26; G06F 16/90332; G06F 16/217; G06N 20/00; G06N 3/08; G06N 3/044; G06N 3/0464
   See application file for complete search history.

(56) References Cited

U.S. PATENT DOCUMENTS

| | | |
|---|---|---|
| 6,466,931 B1 | 10/2002 | Attaluri et al. |
| 9,244,971 B1 | 1/2016 | Kalki |
| 9,367,608 B1 | 6/2016 | Zhang |
| 9,684,712 B1 | 6/2017 | Todd |
| 10,121,157 B2 | 11/2018 | Agarwal et al. |
| 10,257,263 B1 | 4/2019 | Wagner |
| 11,263,401 B2 * | 3/2022 | Setayesh ............... G06F 16/335 |
| 11,429,665 B2 | 8/2022 | Thakkar et al. |
| 11,971,896 B2 | 4/2024 | Brown et al. |
| 2004/0083205 A1 | 4/2004 | Yeager |
| 2004/0158551 A1 | 8/2004 | Santosuosso |
| 2005/0256848 A1 | 11/2005 | Alpert et al. |
| 2011/0093257 A1 | 4/2011 | Shpigel et al. |
| 2011/0106746 A1 | 5/2011 | Ventilla et al. |
| 2012/0005190 A1 | 1/2012 | Faeber et al. |
| 2012/0130986 A1 | 5/2012 | Abdellatif et al. |
| 2013/0268527 A1 | 10/2013 | Block |
| 2014/0019443 A1 | 1/2014 | Golshan |
| 2014/0358890 A1 | 12/2014 | Chen et al. |
| 2015/0046204 A1 | 2/2015 | Sitina et al. |
| 2015/0074053 A1 | 3/2015 | Sarferaz |
| 2015/0149182 A1 | 5/2015 | Kalns et al. |
| 2015/0324422 A1 | 11/2015 | Elder |
| 2015/0324908 A1 | 11/2015 | Starikova et al. |
| 2015/0347507 A1 | 12/2015 | Annapragada et al. |
| 2016/0098387 A1 | 4/2016 | Bruno et al. |
| 2016/0098389 A1 | 4/2016 | Bruno et al. |
| 2016/0098394 A1 | 4/2016 | Bruno et al. |
| 2017/0017689 A1 | 1/2017 | Scheibli et al. |
| 2017/0060831 A1 | 3/2017 | Smythe et al. |
| 2017/0147471 A1 | 5/2017 | Shadi et al. |
| 2018/0089320 A1 * | 3/2018 | Hanson ............... G06F 16/9535 |
| 2018/0137249 A1 | 5/2018 | Eggebraaten et al. |
| 2019/0065499 A1 | 2/2019 | Wagstaff et al. |
| 2019/0079978 A1 | 3/2019 | Ali et al. |
| 2019/0095499 A1 | 3/2019 | Payne et al. |
| 2019/0138660 A1 | 5/2019 | White et al. |
| 2019/0340240 A1 | 11/2019 | Duta |
| 2020/0034362 A1 | 1/2020 | Galitsky |
| 2020/0159848 A1 | 5/2020 | Yeo |
| 2020/0183899 A1 * | 6/2020 | Xu ....................... G06F 16/2365 |
| 2020/0302122 A1 * | 9/2020 | Lai ........................... G06F 16/28 |
| 2020/0356604 A1 | 11/2020 | MacDougall |
| 2021/0152534 A1 * | 5/2021 | Xie .......................... H04L 51/02 |
| 2021/0264480 A1 | 8/2021 | Silverstein et al. |
| 2022/0103574 A1 * | 3/2022 | Kwatra ................. G06N 5/022 |
| 2023/0169147 A1 * | 6/2023 | Sivakumar ............... G06N 5/02 |
| | | 382/159 |

OTHER PUBLICATIONS

International Search Report and Written Opinion, Patent Cooperation Treaty Application No. PCT/US2020/024003, Jul. 29, 2020, 18 pages.

United Stated Office Action, U.S. Appl. No. 16/824,803, filed Sep. 14, 2021, 16 pages.

United States Office Action, U.S. Appl. No. 17/830,057, filed Jul. 29, 2024, 12 pages.

Zahir and El Qadi, "A Recommendation System for Execution Plans Using Machine Learning," Mathematical and Computational Applications, 2016, 21(2), 23, pp. 1-13.

Zhao and Sudha, "Entity matching across heterogeneous data sources: An approach based on constrained cascade generalization," Data & Knowledge Engineering, vol. 66, Issue 3, Sep. 2008, pp. 368-381.

* cited by examiner

EXECUTING SERVICES ACROSS MULTIPLE TRUSTED DOMAINS FOR DATA ANALYSIS

CROSS-REFERENCES TO RELATED APPLICATIONS

This application claims the benefits of U.S. Provisional Application No. 63/195,616, filed on Jun. 1, 2021 which is incorporated by reference in its entirety.

FIELD OF INVENTION

This disclosure concerns analysis of data stored across heterogenous data sources in general and more specifically to executing services across multiple trusted domains for analyzing data.

BACKGROUND

Organizations store data in multiple data sources, for example, relational databases, file systems, cloud storage, and so on. The data sources are typically accessible within a trusted domain. Analysis of data stored within the trusted domain can be challenging since the data may include sensitive information that may not be exported outside the trusted domain of the enterprise analyzing the data. Therefore, use of tools that are outside the trusted domain for analyzing the data is challenging. Conventional techniques such as masking of data are used before exporting the data outside a trusted domain. However, these techniques often modify the data, thereby making it difficult to perform detailed analysis of the data, particularly analysis of the sensitive data. As a result, the analysis performed provides only partial information describing the data.

Furthermore, each type of data source may have multiple instances. Each instance of a data source may be provided by a different vendor. For example, the same organization may store some data in an ORACLE database and some data in SQLSERVER database. Each data source can be a complex system that requires an expert who can interact with the system. Due to these complexities, any analysis of the data stored by the organization becomes a complex project. This project may involve several stages including (1) data discovery to identify what data is available in each data source, (2) data import process to ingest data and move it to a storage system for analysis, (3) determination of the subset of data that is of interest, and (4) analysis by running queries and reviewing results for validation. Each stage can take weeks or months depending on the complexity of the data stored. As a result, the organization may take several weeks or months before any visibility is gained into the data stored.

SUMMARY

One or more computing systems of a multi-tenant trusted domain collect metadata describing data stored in data sources of a set of tenant trusted domains. The computing systems of the multi-tenant trusted domain collect the metadata by performing the following steps. For each tenant trusted domain, the computing systems of the multi-tenant trusted domain send to a computing system of the tenant trusted domain, a request to perform data crawling. The computing systems of the multi-tenant trusted domain receive metadata describing data stored in data sources of the tenant trusted domain.

The computing systems of the multi-tenant trusted domain further receive a natural language question based on data stored in data sources of a tenant trusted domain. The computing systems of the multi-tenant trusted domain identify a set of data sources of the tenant trusted domain that are relevant for processing the natural language question. The computing systems of the multi-tenant trusted domain generate an execution plan for answering the natural language question. The execution plan generated based on the collected metadata. The computing systems of the multi-tenant trusted domain send the execution plan to one or more computing systems of the tenant trusted domain. The computing systems of the tenant trusted domain execute the execution plan and send the result of executing the execution plan to a client device that sent the natural language question.

According to an embodiment, the system modifies services used for a data pipeline. One or more computing systems of a multi-tenant trusted domain collect metadata describing data stored in data sources of a plurality of tenant trusted domains. The computing systems of the multi-tenant trusted domain host a first set of services for processing metadata received from a tenant trusted domain. The services from the first set of services interact with a second set of services hosted by each of the plurality of tenant trusted domain. The second set of services process the data stored in one or more data sources of the tenant trusted domain. The system executes a data pipeline using (1) services of the first set of services of the multi-tenant trusted domain and (2) services of the second set of services of a particular tenant trusted domain. The services of the first set of services process metadata obtained from the particular tenant trusted domain. The services from the second set of services of the particular tenant trusted domain process data stored in data sources of the particular tenant trusted domain. For each of the plurality of tenant trusted domains, the one or more computing systems of the multi-tenant trusted domain receive credentials for interacting with one or more computing systems of the tenant trusted domain. The credentials provide access for modifying services from the second set of services of the tenant trusted domain. For each of the plurality of tenant trusted domains, the computing systems of the multi-tenant trusted domain cause modification of a particular service of the second set of services using the credentials obtained from the tenant trusted domain. The modification comprises installation of executable instructions for the particular service. The system executes the data pipeline using (1) services of the first set of services of the multi-tenant trusted domain and (2) services of the second set of services of the particular tenant trusted domain including the modified particular service.

According to an embodiment, the computing systems of the tenant trusted domain cause modification of a particular service of the second set of services using the credentials obtained from the tenant trusted domain is performed by sending the credentials received from the tenant trusted domain to a provider system. The provider system uses the credentials to send executable instructions for the particular service to the computer system of the tenant trusted domain.

According to an embodiment, the computing systems of the tenant trusted domain cause modification of a particular service of the second set of services using the credentials obtained from the tenant trusted domain is performed by receiving executable instructions for the particular service from a provider system and using the credentials received from the tenant trusted domain to send executable instructions for the particular service to the computer system of the tenant trusted domain for installation.

According to an embodiment, collecting metadata describing data stored in data sources of the plurality of tenant trusted domains is performed as follows. For each tenant trusted domain, the computing systems of the multi-tenant trusted domain send a request to perform data crawling to a computing system of the tenant trusted domain. The computing systems of the multi-tenant trusted domain receive metadata describing data stored in data sources of the tenant trusted domain.

Figure 1:
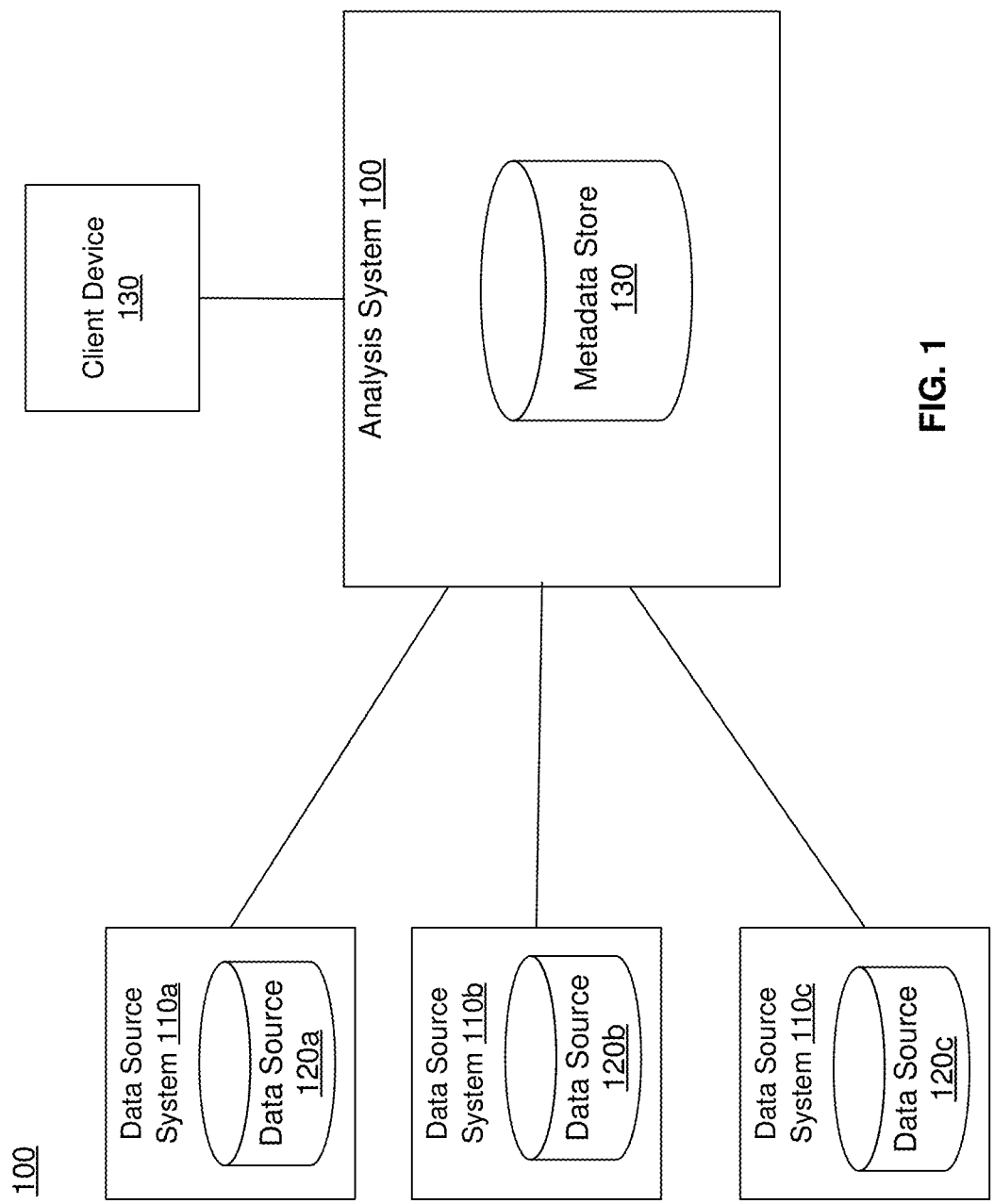
FIG. 1 is an overall system environment for performing data model based analysis of data, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Conventional techniques require users to extract data from multiple sources to analyze and determine whether the data serves a specified purpose, for example, whether it answers a given question. Conventional systems perform ETL (extract, transform, and load) process to extract all data from each data source to be able to join the data. Following steps are typically performed for answering a question based on data stored across a plurality of heterogeneous data sources: (1) Ask user to identify each data source. (2) Perform ETL (extract transform load) job to move all data from the data source. (3) Receive from users, a filter and determine a subset of the data obtained from each data source. (4) Receive from users, a query to join the subset of data from each data source. (5) Generate a table storing the join result. (6) Execute the query using the table, for example, using a BI (business intelligence) tool. Using ETL to move data from one system to another may require sensitive information to be copied from one system to another for analysis. Enterprises store data as well as process data using services that are within a trusted domain. For example, the data is stored in data stores that are within the trusted domain and the services or systems that process the data are also executing within the trusted domain. The systems that process the data of the enterprise use specific access control mechanisms to get access to the systems within the trusted domain. Any system that is not able to use the access control mechanisms to get access to the systems within the trusted domain is outside the trusted domain. Enterprises prefer that any sensitive information is not copied to a system outside the trusted domain of the enterprise.

Embodiments execute an analysis pipeline that executes various operations (or steps) for processing data. Each operation or step may be executed by a system or service. A service comprises a process that receives requests and processes instructions in response to the request and provides a response to the request. A service may execute an application that comprises instructions that are executed. For example, a data management service may use a database management system as an application that processes requests. A particular operation may use an application for processing the data. Different operations may be performed by different services or applications that execute on different systems. Both applications and services represent processes executing on computing systems. A given application or service may have several processes running simultaneously. The set of systems that execute the analysis pipeline may also be referred to as the analysis system.

According to an embodiment, the analysis pipeline is executed on systems that belong to at least two different trusted domains, a trusted domain D1 and a trusted domain D2. Some operations of the analysis pipeline are executed on systems that belong to trusted domain D1 and other operations are executed by systems that belong to a trusted domain D2. The data that is processed is stored in systems that belong to one of the trusted domains, for example, D1. Metadata describing the data is extracted and exported to the other trusted domain, i.e., D2. Operations of the pipeline that process the data are executed within the trusted domain D1. Operations that process the metadata, without requiring access to the data are executed on the systems of trusted domain D2. The systems of the two trusted domains interact with each other to execute the analysis pipeline. For example, result of execution of an operation may be transmitted from systems of one trusted domain to systems of the other trusted domain to continue processing in accordance with the analysis pipeline. Although information is transmitted across trusted domains, the systems according to various embodiments ensure that only metadata is transmitted from trusted domain D1 to trusted domain D2 and data that includes sensitive information is only stored on systems within trusted domain D1 and never transmitted to trusted domain D2.

In an embodiment, the trusted domain D1 is referred to as a tenant trusted domain and trusted domain D2 is referred to as a multi-tenant trusted domain. Accordingly, the multi-tenant trusted domain may interact with multiple tenant trusted domains and receive and process metadata from multiple trusted domains. However, the multi-tenant trusted domain only receives and stores metadata from different tenant trusted domains. All data that includes sensitive information is stored within each tenant trusted domain. Systems for processing data stored across heterogeneous data stores are described in the U.S. patent application Ser. No. 16/824,458, filed on Mar. 19, 2020, which is incorporated by reference herein in its entirety.

System Environment

FIG. 1 is an overall system environment for performing analysis of data, in accordance with an embodiment. The system environment comprises an analysis system 100, one or more data source systems 110a, 110b, 110c, one or more third party systems, and one or more client devices 130. The analysis system 100 obtains data and metadata from various data source systems 110 and data models from third party systems and performs analysis of the data stored in the data source systems using the data models. The analysis system may present the analysis via a user interface of the client device 130. The details of the analysis system 100 are further described herein, for example, in FIG. 2.

The data source systems 110 store data, for example, data used by an organization or enterprise. A data source system 110 comprises instructions for processing data stored in the data source system 110 and one or more data sources 120a, 120b, 120c. A data source 120 of the data source system 110 has a data source type, for example, a relational database, a file system, a document oriented database system, and so on. As a result, the system environment shown in FIG. 1 comprises the analysis system 100 connected to a plurality of heterogenous data sources, each data source possibly having a distinct data source type.

The analysis system 100 executes the instructions of the data source system 110, for example, by invoking the API (application programming interfaces) of the data source system 110 to access the data of the data source 120. For example, a data source system 110 may be a database management system such that the data source is a database. The analysis system 100 may execute API such as JDBC to access the data stored in a database management system. As another example, a data source system 110 may be a file system, for example, HDFS (HADOOP file system) and the data source refers to the files of the file system that store the data.

A particular type of data source may have multiple instances, for example, instances of relational databases. Different instances of a data source may be provided by different vendors. For example, the same organization may store data in relational databases including instances of ORACLE database, SQLSERVER, TERADATA, MYSQL, and so on. Other examples of data sources include data lakes, for example, data lakes offered by CLOUDERA; files stored in a distributed file system, for example, HDFS (HADOOP distributed file system; and cloud data warehouses. A data source may be stored in a cloud based system, for example, AWS (AMAZON web services), MICROSOFT AZURE, and so on.

The third-party systems provide additional information for example, data models to the analysis system. In an embodiment, a data model represents a virtual data model generated from questions received from users, for example, natural language questions. The analysis system 100 may store the virtual data models generated from questions and use them for processing subsequent questions received from users. In an embodiment, a data model comprises entities and relations between entities. Each entity may comprise attributes (also referred to herein as fields). Each entity represents a set of records. A data model is associated with a set of questions that can be answered using the data model. The questions may be natural language questions or may be specified using a programming language. The questions can be translated into instructions for processing the question using the data model. For example, the instructions may use operations such as filtering, selecting fields, joining entities using relations and so on. The data model may specify data types of the fields. The data model may specify additional information describing the fields, for example, data format of the fields. For example, a field storing address information may be required to conform to certain data format used by standard addresses, a field storing date values may conform to certain date formats, and so on.

The client device 130 used by a user for interacting with the analysis system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 130 can be any device having computer functionality, such as a personal digital assistant (PDA), mobile telephone, smartphone, wearable device, etc. The client device 130 may be used by a user to view results of analysis performed or for providing instructions to the analysis system 100.

FIG. 1 and the other figures use like reference numerals to identify like elements. A letter after a reference numeral, such as "110a" indicates that the text refers specifically to the element having that particular reference numeral. A reference numeral in the text without a following letter, such as "110," refers to any or all of the elements in the figures bearing that reference numeral (e.g., "110" in the text refers to reference numerals "110a" and/or "110n" in the figures).

The interactions between the analysis system 100 and the other systems shown in FIG. 1 are typically performed via a network, for example, via the Internet. The network enables communications between the different systems. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

System Architecture

Figure 2:
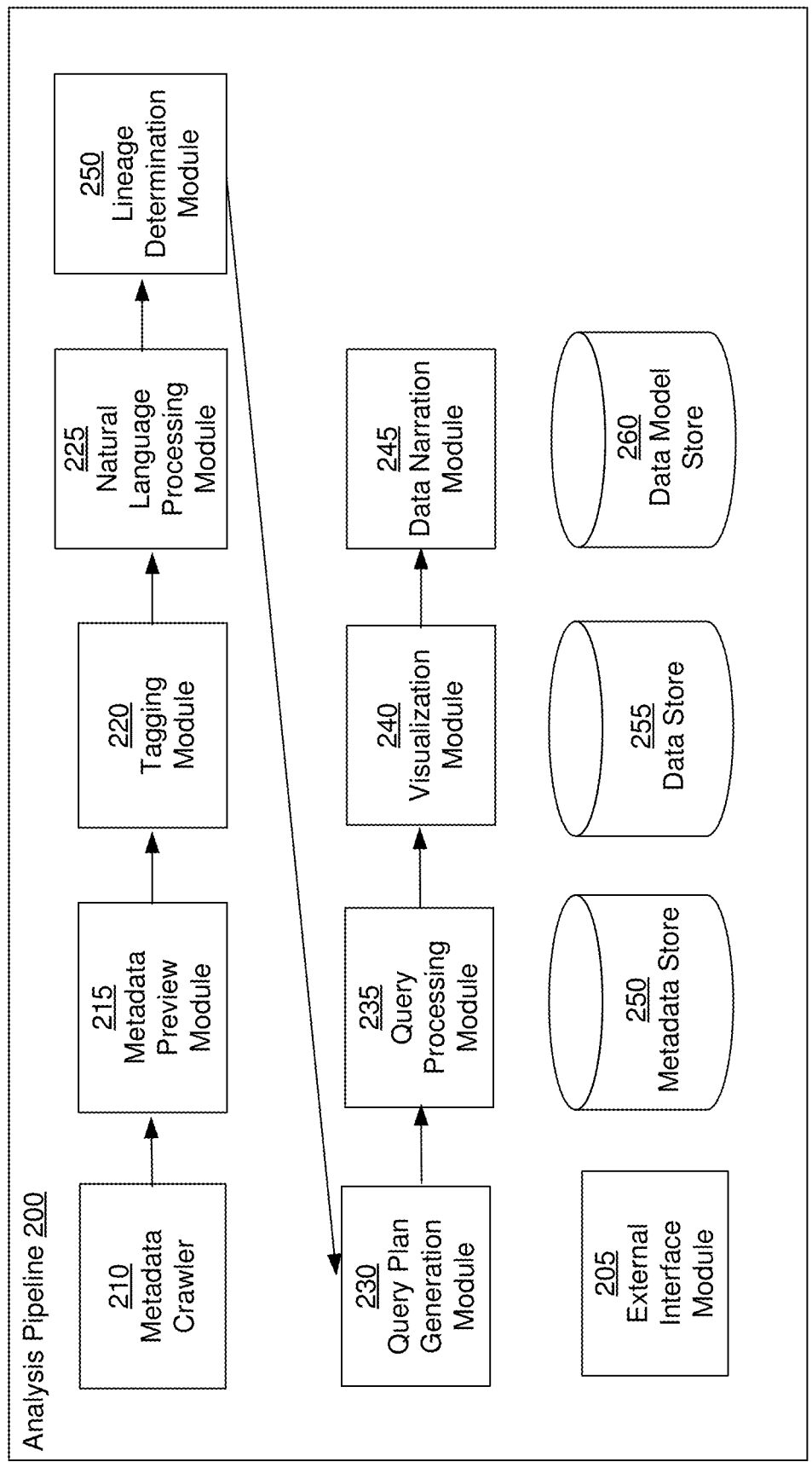
FIG. 2 shows various modules for performing operations of an analysis pipeline, in accordance with an embodiment.

FIG. 2 shows various modules for performing various operations of an analysis pipeline, in accordance with an embodiment. The modules include external interface nodule 205, metadata crawler 210, metadata preview module 215, tagging module 220, natural language processing module 225, query plan generation module 230, lineage determination module 250, query processing module 235, visualization module 240, data narration module 245, metadata store 250, a data model store 260, and data store 255. Other embodiments may include fewer or more modules than those indicated herein. Functionality indicated herein as being performed by a particular module may be performed by other modules instead.

The external interface module 205 interfaces with external systems, for example, data source systems, third party systems, and client devices. In particular, the external interface module 205 receives connection parameters for connecting with external systems, for example, data source systems. The external interface module 205 establishes a connection with the data source system to receive metadata or data from the data source system. The external interface module 205 stores metadata received from data source systems in the metadata store 250. The external interface module 205 establishes connections with the third-party systems to receive data models. The external interface module 205 stores data models received from third-party systems in the data model store 260. The analysis module 230 also generates virtual data models from questions asked by users and stores them in the data model store 260.

The data store 255 stores the data that is being processed. The data stored in the data store includes user data as well as any other kind of data that may be processed. The metadata store 250 stores metadata describing the data stored in one or more data stores 255. The metadata crawler 210 processes the data stored in the data store 255 to extract metadata information describing the data. The metadata information may include a schema of the data, various attributes of the data, data type of the attributes, and so on. The metadata information may further include statistics describing the various values, for example, distribution of different attributes. The metadata preview module 215 allows users to preview the metadata, for example, via a user interface.

The tagging module 220 tags the metadata with additional information describing the data. The tagging may be performed by users, for example, experts that analyze the data. The tagging may be performed automatically based on analysis done by users. For example, if the data is accessed as a result of certain keyword searches, the metadata describing the data may be tagged with those keywords.

The natural language processing module 225 receives natural language questions and processes them to allow users to access data based on the natural language questions. The lineage determination module 265 determine lineage of data based on metadata analysis. The lineage tracks the origin of the data. The query plan generation module 230 generates a query plan in response to a query that may be based on a database query language of a natural language question. The query processing module 235 receives a query execution plan and executes the query to access the data matching the query. The visualization module 240 allows users to visualize data, for example, using a user interface that presents charts or graphs describing the data. The data narration module 245 narrates a story describing the data. Accordingly, the data narration module 245 analyzes the data and generates a plain English description of the data.

The analysis pipeline 200 may include other modules (not shown in FIG. 2) for example, a matching module, a match score module, a question builder, a pre-processing module, and a data quality assessment module. The actions performed by these modules and the processes executed by these modules are further described herein. A module that performs an operation of the analysis pipeline 200 may also be referred to herein as a service that performs the operation. A module that performs an operation of the analysis pipeline 200 may also be referred to herein as a tool (or software tool) that performs the operation. A module that performs an operation of the analysis pipeline 200 may also be referred to herein as an application (or software application) that performs the operation. The analysis pipeline 200 may also be referred to herein as a data analysis pipeline or a data pipeline.

The matching module matches the metadata describing the data stored in the data source systems against questions, for example, using virtual data models generated form questions to determine whether the data source provides the required information.

The match score module determines a match score for questions or data models matched against data of one or more data sources. The match score module matches the table names/file names or names of collections of data of the data source to determine whether a question or data model matches data of the data source.

The question builder allows users to ask natural language questions that the analysis system converts to query languages processed by systems, for example, SQL (structured query language). The question builder receives requests from users to identify questions that can be answered using one or more data sources and performs the processing necessary to answer the questions.

The pre-processing module determines quality of data that is available for answering a question or questions associated with a data model and determines whether preprocessing is required for improving the quality of the data. The pre-processing module makes recommendations for portions of data that should be cleansed to improve the quality of the data to process a question.

According to an embodiment, a data quality assessment module determines measures of data quality of data sources to improve matching accuracy. In an embodiment, the data quality assessment module measures data quality based on analysis of values stored in a data source, for example, based on number of null values stored in a column, number of format errors in values stored in a column, and so on. The data quality assessment module determines and provides metrics indicative of data quality to the match score module and the match score module uses the metrics received for determining match scores for data models or questions.

The different modules of the analysis pipeline 200 may execute instructions in response to commands executed by a user via a user interface of the client device. For example, the system may present a user interface via a client device 130 that allows a user to interact with the system to identify various questions that can be answered using the data sources used by an organization and execute specific question.

The data of an enterprise is stored in data stores that are within a trusted domain. Embodiments ensure that the data of the enterprise can be processed and analyzed without requiring the data to be exported to a system outside the trusted domain of the enterprise. This may be achieved by transmitting the services and processing of all data to the trusted domain of the enterprise. However, maintaining such large number of services and systems for processing this information is costly. Furthermore, the enterprise may not use several of these services on a regular basis, thereby resulting in waste of these resources. Embodiments distribute the services across multiple trusted domains so that only a subset of services are executed within the trusted domain of the enterprise and the remaining services are executed in a second trusted domain and may be shared across multiple enterprises to improve their resource utilization.

Figure 3:
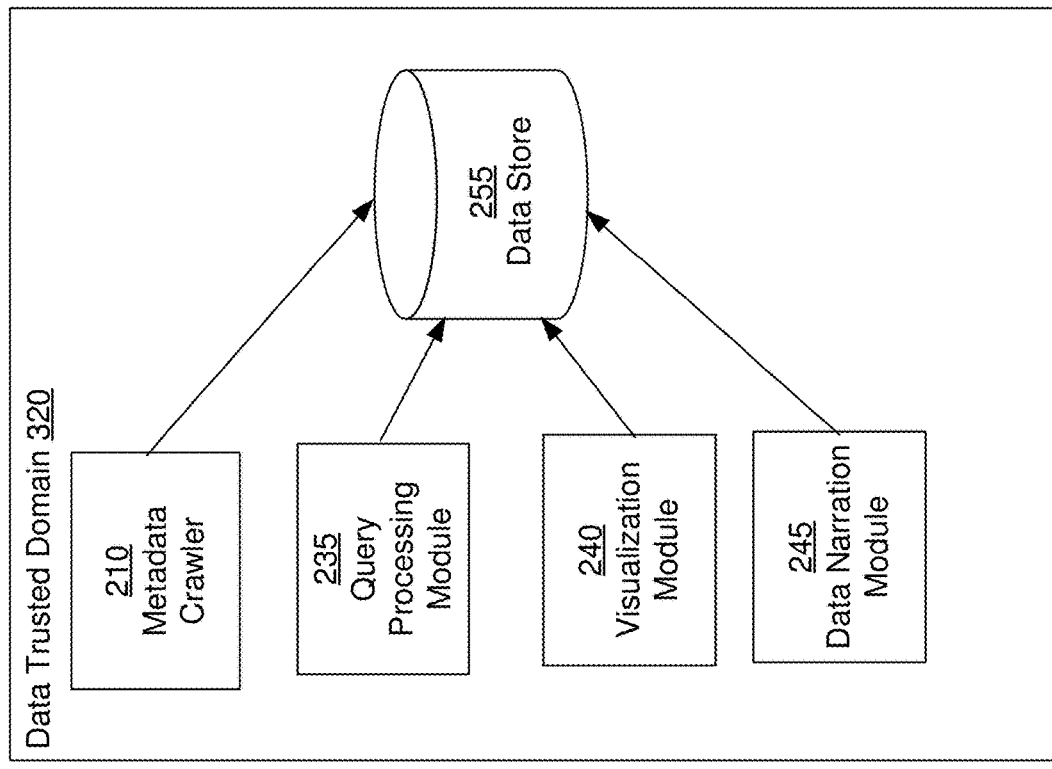
FIG. 3 illustrates the distribution of the services used by the analysis pipeline across two trusted domains, according to an embodiment.
Figure 3:
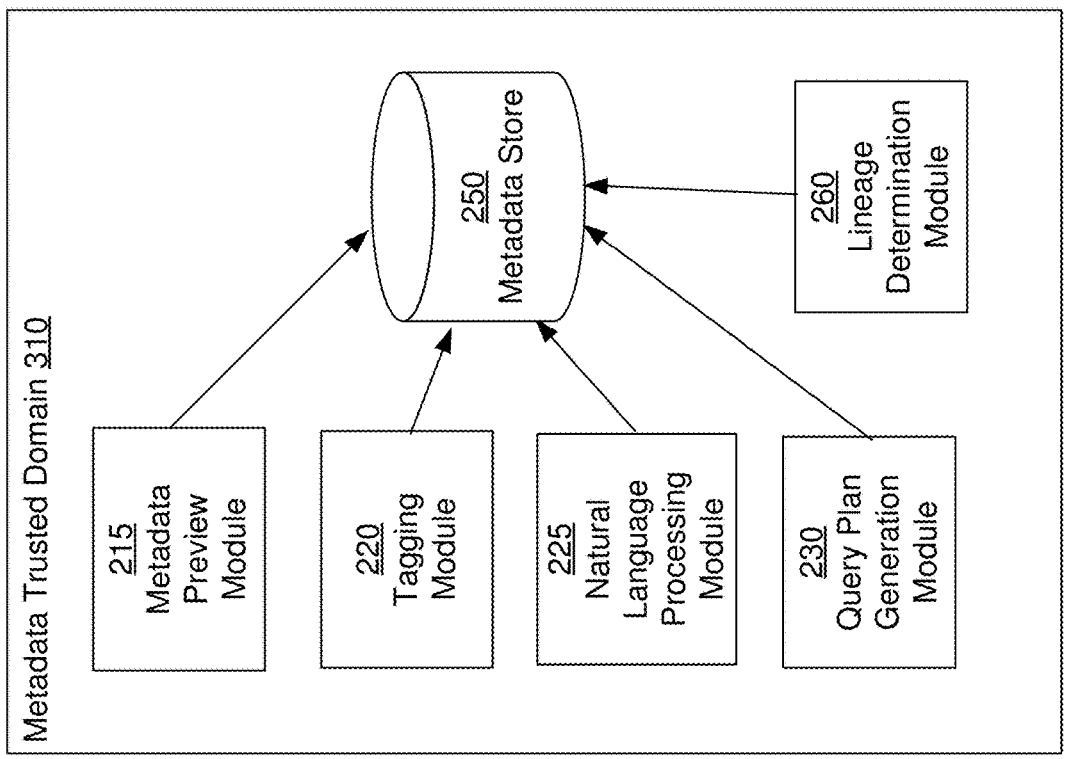

FIG. 3 illustrates the distribution of the services used by the analysis pipeline across two trusted domains, according to an embodiment. The trusted domain 320 includes the data stores 255 that store the data including any sensitive information of the enterprise. Services that need direct access to the data for processing are executed on computing systems within the trusted domain 320 of the enterprise. These include (1) metadata crawler 210 that needs to analyze the data and generate metadata describing the data and therefore needs direct access to the data, (2) query processing module 235 that needs to execute query plans using the data stored in the data store 255, (3) visualization module 240 that processes the data stored in the data store 255 to generate charts and graphs to visualize the data, and (4) data narration module 245 for analyzing the data and performing narration and storytelling for describing the data analysis. These modules require direct access to the data and are therefor located within the trusted domain 320 of the enterprise.

Other services/modules that perform analysis based on metadata and do not require access to the data of the data store 255 are executed on computing systems in another trusted domain 310. Accordingly, services that process metadata are executed on computing systems in trusted domain 310. The trusted domain 310 may be shared across multiple trusted domains such as trusted domain 320. This increases the resource utilization of the resources of the trusted domain 310.

The metadata describing the data of the data store 255 may be extracted by the metadata crawler 210 and transmitted to the metadata store 250 of the trusted domain 310. Accordingly, the metadata store 250 stores metadata describing data stored in data stores 255 of one or more enterprises. The services executing in the trusted domain 310 include (1) metadata preview module 215 that provides a preview of metadata describing data of one or more enterprises, (2) a tagging module 220 that tags the metadata to add additional information to the metadata, (3) a natural language processing module 225 that receives natural language questions and analyzes them to generate a virtual data model based on the natural language question, (4) an query plan generation module 230 that uses the metadata to generate a query execution plan for determining results that match the natural language question. The query plan generation module 230 may use a virtual data model to generate the query execution plan. Note that the query execution plan is transmitted to the trusted domain 320, for example, to the query processing module 235 for execution by the computing systems of the trusted domain 320 that have access to the data. Accordingly, the services executing within the trusted domain 310 perform any processing or operations of the analysis pipeline 200 that can be performing using the metadata and without requiring direct access to the data stored in the data store 255. The services that require direct access to the data stored in the data store 255 are executed within the trusted domain 320.

The trusted domain 310 may be referred to herein as the metadata trusted domain 310 that stores metadata of one or more enterprises but does not receive data of the enterprises. The trusted domain 320 may be referred to as the data trusted domain 320 that stores data of an enterprise.

The trusted domain 320 may be referred to as the tenant trusted domain 320 that stores data of an enterprise representing a tenant of a multi-tenant system. The trusted domain 310 may be referred to herein as the multi-tenant trusted domain 310 that stores metadata of one or more enterprises each representing tenants of the multi-tenant system but does not receive data of the enterprises.

Figure 4:
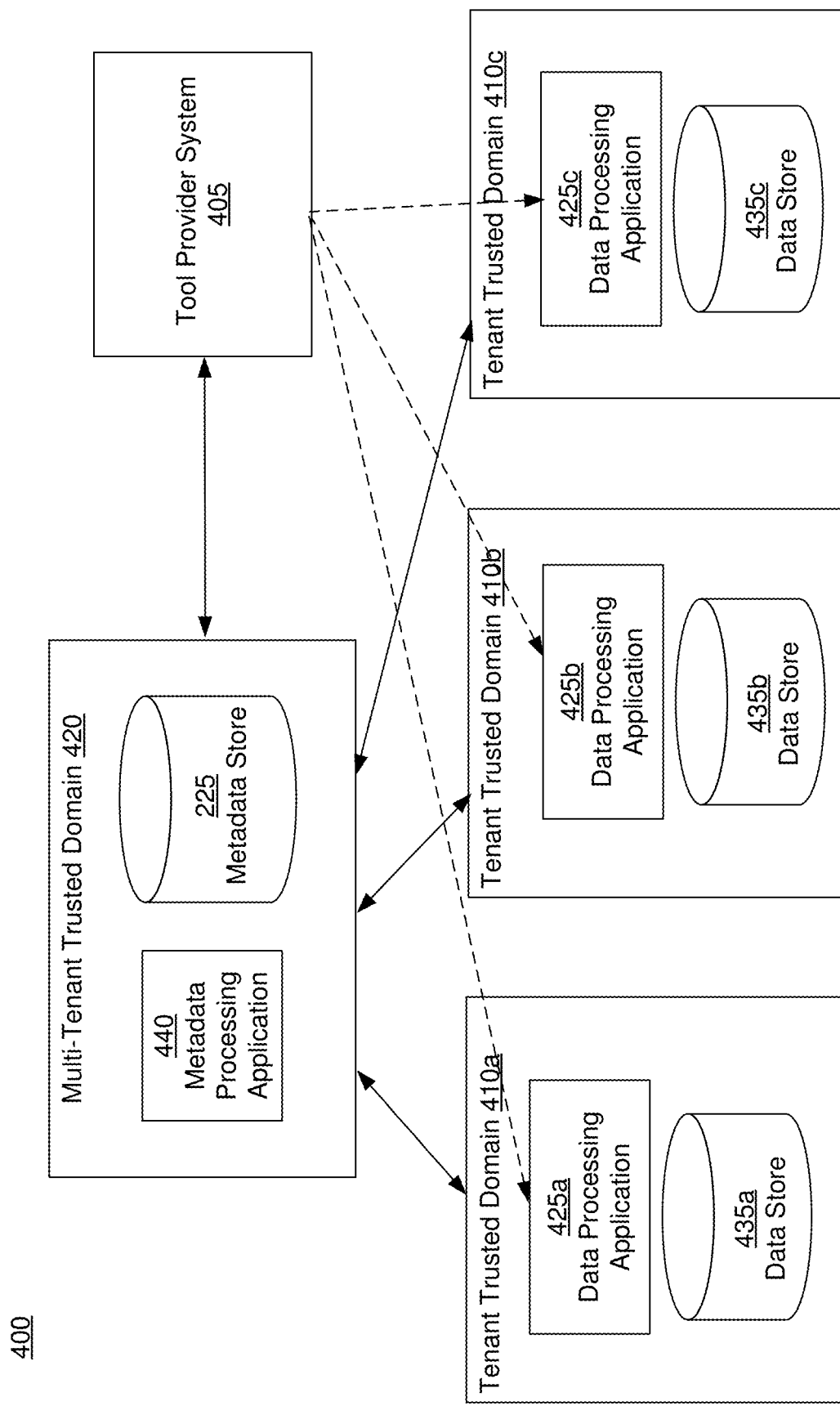
FIG. 4 illustrates the distribution of the services across a multi-tenant architecture, according to an embodiment.

FIG. 4 illustrates the distribution of the services across a multi-tenant architecture, according to an embodiment. The system environment 400 includes a multi-tenant trusted domain 420 and a setoff tenant trusted domains 410*a*, 410*b*, 410*c*, and so on. The tenant trusted domains 410*a*, 410*b*, 410*c* include data stores 435*a*, 435*b*, 435*c* respectively. The tenant trusted domains 410 are equivalent to data trusted domains and store enterprise data in data stores 435. The multi-tenant trusted domain 420 is equivalent to a metadata trusted domain and stores metadata describing data of one or more enterprises. The metadata is stored in the metadata store 250. The analysis pipeline is executed using a set of services or applications distributed across the various trusted domains in FIG. 4.

More specifically, the metadata processing applications 440 are executed within computing systems of the multi-tenant trusted domain 420. The metadata processing applications 440 perform operations of the analysis pipeline 200 that can be performed using metadata and do not require access to data of the data stores. Examples of metadata processing applications 440 include metadata preview module 215, tagging module 220, natural language processing module 225, query plan generation module 230, lineage determination module 265, and so on.

Furthermore, the data processing applications 425 are executed within computing systems of the tenant trusted domain 420. The data processing applications 425 perform operations of the analysis pipeline 200 that require access to data of the data stores. Examples of data processing applications 440 include metadata crawler 210, query processing module 235, visualization module 240, data narration module 245, and so on.

The data processing applications 425*a*, 425*b*, 425*c* of the various tenant trusted domains 410*a*, 410*b*, 410*c* are integrated in the analysis pipeline. The instructions of data processing application 425 may be obtained from a tool provider system 405 that may be associated with a vendor that provides the data processing application. Different data processing applications 425 may be provided by different tool provider systems. Each tenant trusted domain 410 may include a separate instance of a data processing application provided by a tool provider system 405. Accordingly, the environment 400 of FIG. 4 allows the system to upgrade, modify, or replace multiple instances of a data processing application of a plurality of tenant trusted domains. The multi-tenant trusted domain 420 has access permissions to modify data processing applications or install new data processing applications across a plurality of tenant trusted domains. A computing system of multi-tenant trusted domain 420 may obtain a library with instructions for a data processing application from a tool provider system 405 and install the library across multiple tenant trusted domains so as to modify an existing data processing application from the analysis pipeline or add a new data processing application to the analysis pipeline. The computing system of the multi-tenant trusted domain 420 may provide access to the tool provider system 405 to directly install the library across multiple tenant trusted domains so as to modify an existing data processing application from the analysis pipeline or add a new data processing application to the analysis pipeline. The computing system of the multi-tenant trusted domain 420 may provide access to the tool provider system 405 by providing temporary tokens for each tenant trusted domain that allow the tool provider system 405 to make modifications to an existing data processing application or install a new data processing application across a plurality of tenant domain systems. Accordingly, the multi-tenant trusted domain 420 acts as a marketplace for data processing application by providing tool provider systems with access to a large number of tenant domain systems. A data processing application 425 may work based on a subscription model where the enterprise managing the tenant trusted domain 410 compensates a vendor controlling the tool provider system 405 on a period basis.

Workflow Scenarios

FIGS. 3A-H illustrate the user interfaces for interacting with the analysis system, in accordance with an embodiment. The user interfaces may be presented by an application, for example, the internet browser executing on a client device 130 that interacts with the analysis system 100.

Figure 5A:
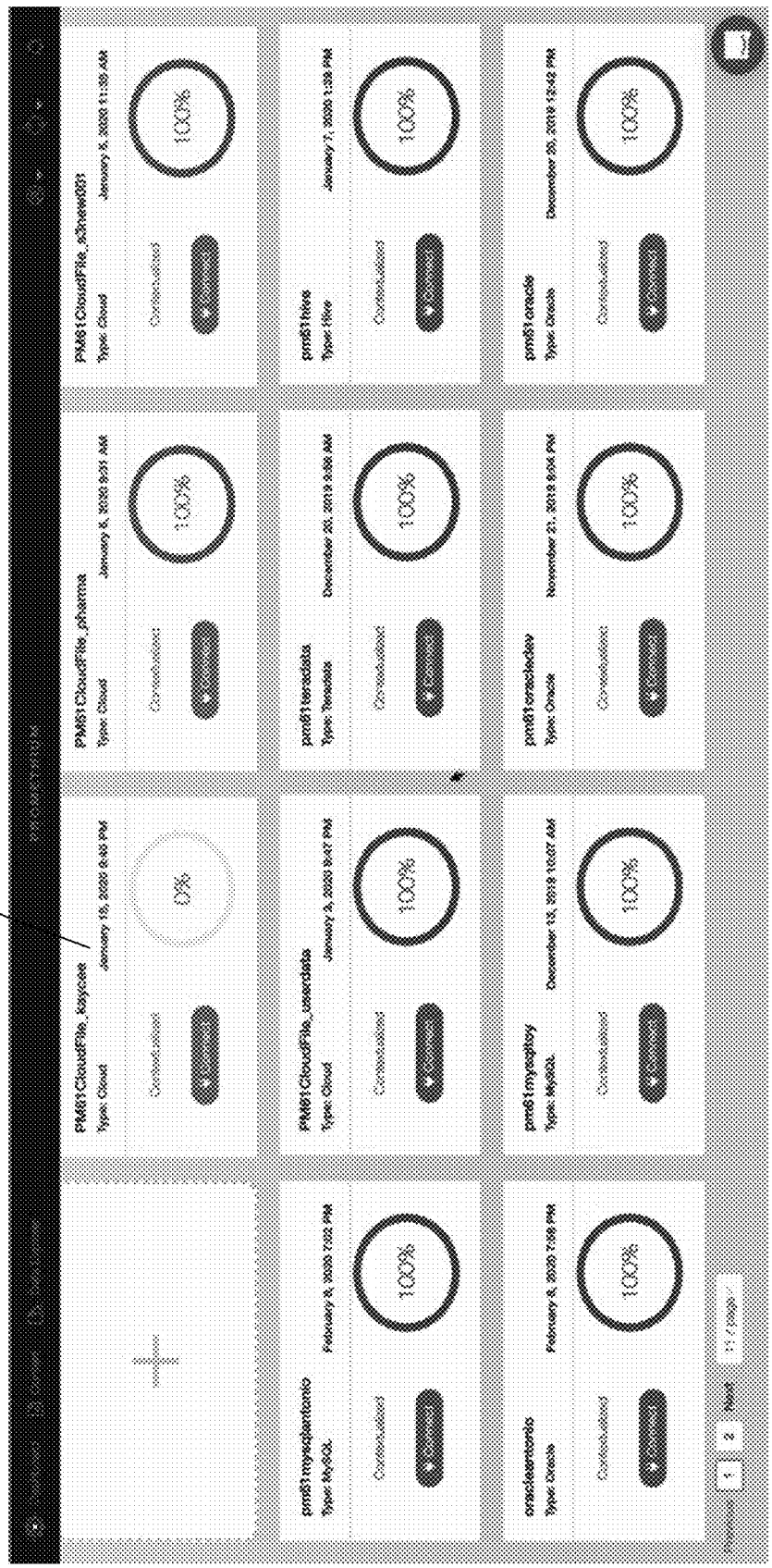
FIG. 5A shows a user interface presenting a comprehensive view of all data sources available in a system environment, according to an embodiment.

FIG. 5A shows a user interface presenting a comprehensive view of all data sources available in a system environment, according to an embodiment. The user provides information describing various data sources 505 in a system environment to the system. The information describing a data source includes the address for creating a connection with the data source, for example, a network address or a URL (uniform resource locator). The information describing a data source may include a port number for creating a connection with the data source. The information describing a data source may include credentials required for creating a connection with the data source, for example, a login identifier and a password or a security token that allows the system to create a connection with the data source. The system may connect with different types of data sources including relational data management systems (RDBMS), HADOOP file system (HDFS), cloud based systems such as S3 file system, and so on.

Each data source comprises data assets that represent smaller units of data storage, for example, tables in an RDBMS, or files in a file system. The system connects with various data sources and retrieves metadata describing the data in each data source without retrieving data stored in the data assets. Examples of metadata include various fields in a table or various columns in a file. For example, if a user table stores information describing specific users, the system retrieves metadata such as various fields of the table but does not retrieve records describing specific users. The system presents information describing data assets of a data source to the user via a user interface that allows the user to select specific fields for further analysis.

Figure 5B:
FIG. 5B shows the user interface for receiving a search request and presenting data assets that match the search request, according to an embodiment.

FIG. 5B shows the user interface for receiving a search request 510 and presenting data assets that match the search request, according to an embodiment. As shown in FIG. 5B several results 512 representing data assets matching the search requests may be presented via the user interface. The system performs the search across multiple data sources and identifies any data asset that matches the search request including tables, columns, files, and so on. The user interface provides the file/table/column name, a vendor name for the data source, a system name for the data source, a data type for the data asset, and location (URL) of the data source.

The system allows users to determine how a particular data asset returned as a search result is being used by other users. The system provides a column 515 storing information describing associated questions for each data asset. The user can interact with the fields of the column 515 to access questions associated with the column. Accordingly, the analysis system presents a user with a set of questions associated with a data asset representing the search result.

Figure 5C:
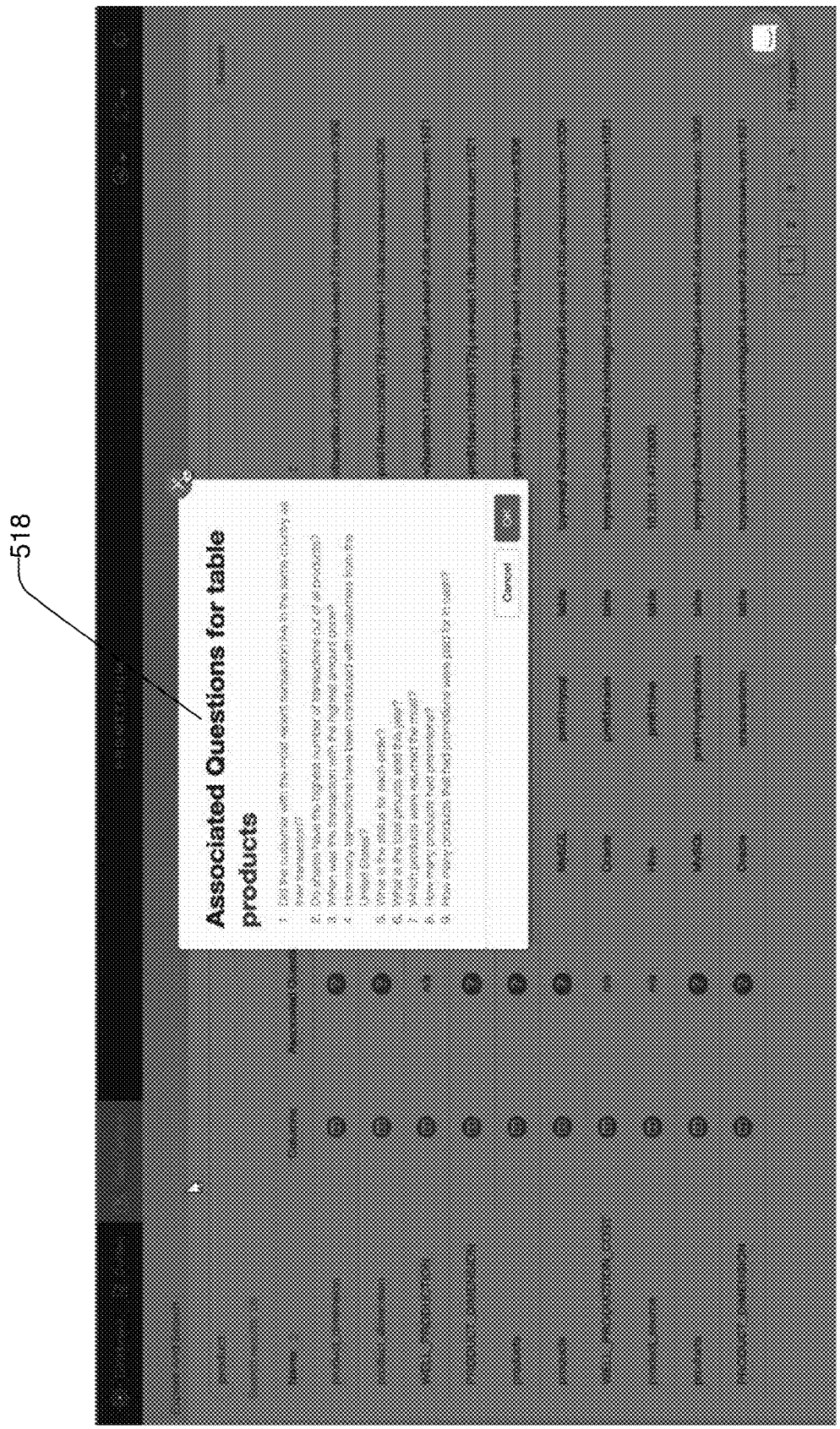
FIG. 5C shows the user interface for presenting associated questions for a search result, according to an embodiment.

FIG. 5C shows the user interface for presenting associated questions 518 for a search result, according to an embodiment. The associated questions may represent questions that were asked by other users for which this data asset was returned. The analysis system stores these questions and associated execution plans and virtual data models. An associated question is also referred to herein as a stored question since the question was previously asked by user and is stored by the analysis system.

In an embodiment, the system tracks the search results that a user accessed to identify questions associated with a data asset. For example, if a data asset is returned as a result of a natural language question and the user accesses the data asset returned in response to the question, the analysis system associates that question with the data asset. Similarly, if a data asset is returned as a result of a natural language question and no user accesses the data asset returned in response to the question, the analysis system does not associate that question with the data asset.

In an embodiment, the system stores weights with each association between a data asset and a question. For example, the weight of an associated question for a data asset may depend on the frequency with which a data asset is accessed by users in response to the question. The weight of an associated question for a data asset may depend on the amount of time that the data asset is accessed by users in response to the question. The higher the frequency with which a data asset is accessed in response to a question, the higher the weight of the association between the question and the data asset as determined by the system. Similarly the higher the amount of time that a data asset is used by users, for example, for processing or for viewing information describing the data asset in a user interface, the higher the weight of the association between the question and the data asset as determined by the system.

Figure 5D:
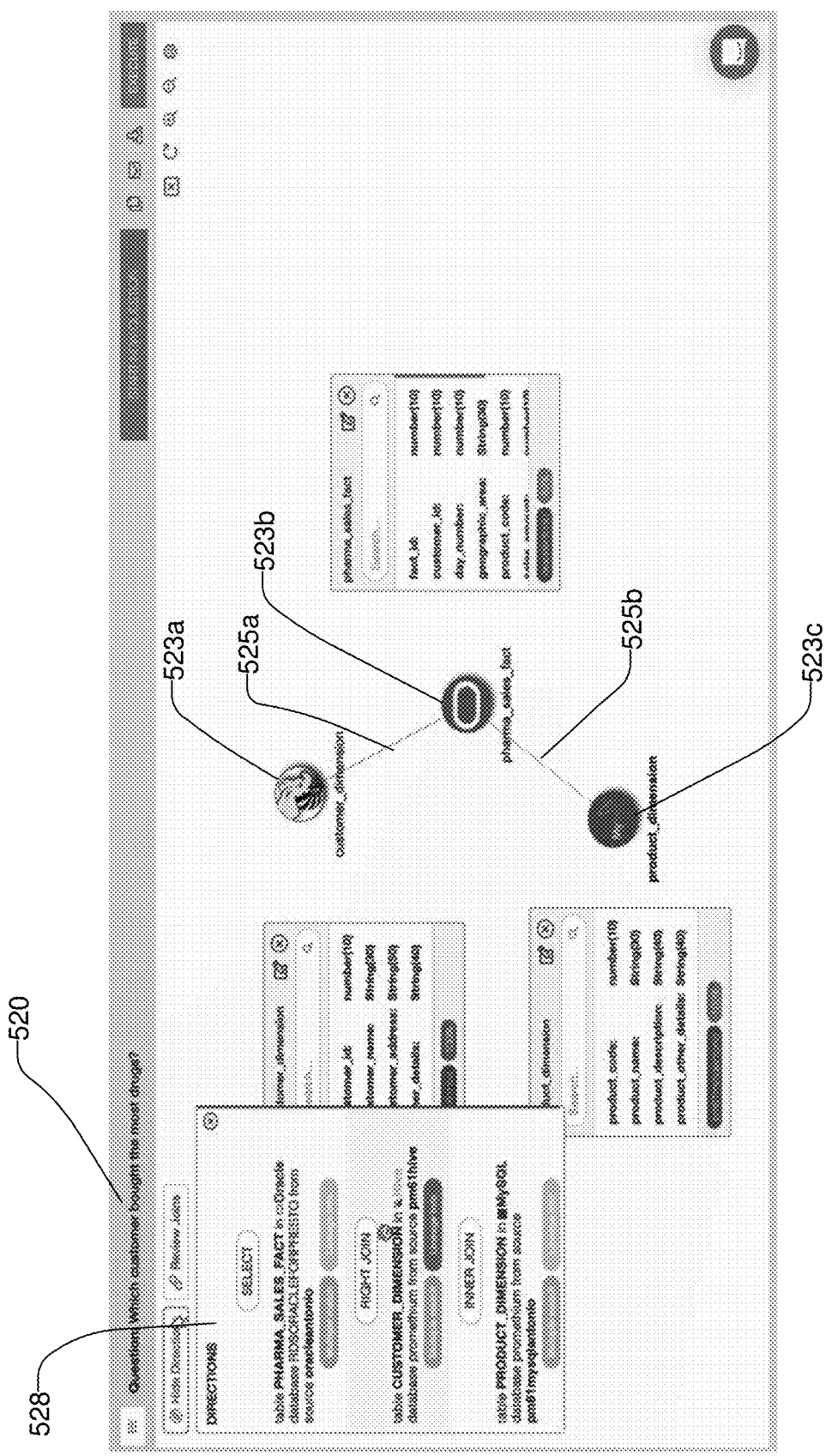
FIG. 5D shows a user interface presenting a virtual data model for a question, according to an embodiment.

In an embodiment, the system builds a virtual data model representing a question. The virtual data model may comprise one or more entities and relations between the entities. FIG. 5D shows a user interface presenting a virtual data model for a question 520, according to an embodiment. The virtual data model comprises entities 523a, 523b, 523c and relationships between the entities, for example, relationship 525a between entities 523a and 523b and relationship 525b between entities 523b and 523c. The analysis system 100 further generates and displays instructions 528 representing directions to the various systems for accessing the required data assets from their corresponding data source to be able to answer the question 520. The instructions may specify how the various data assets should be combined to generate the result, for example, whether two tables should be joined, what columns to use for joining and the type of join (inner join, left outer join, right outer join, etc.)

The user interface further allows a user to inspect all possible data assets that may correspond to an entity in the entity relationship graph representing the virtual data model constructed for the question. The system may rank the data assets based on their relevance and select a data asset by default. However, the user interface allows the user to change the selected data asset and use a different data asset for that entity. The system uses any modified data assets for answering the question received from the user.

Figure 5E:
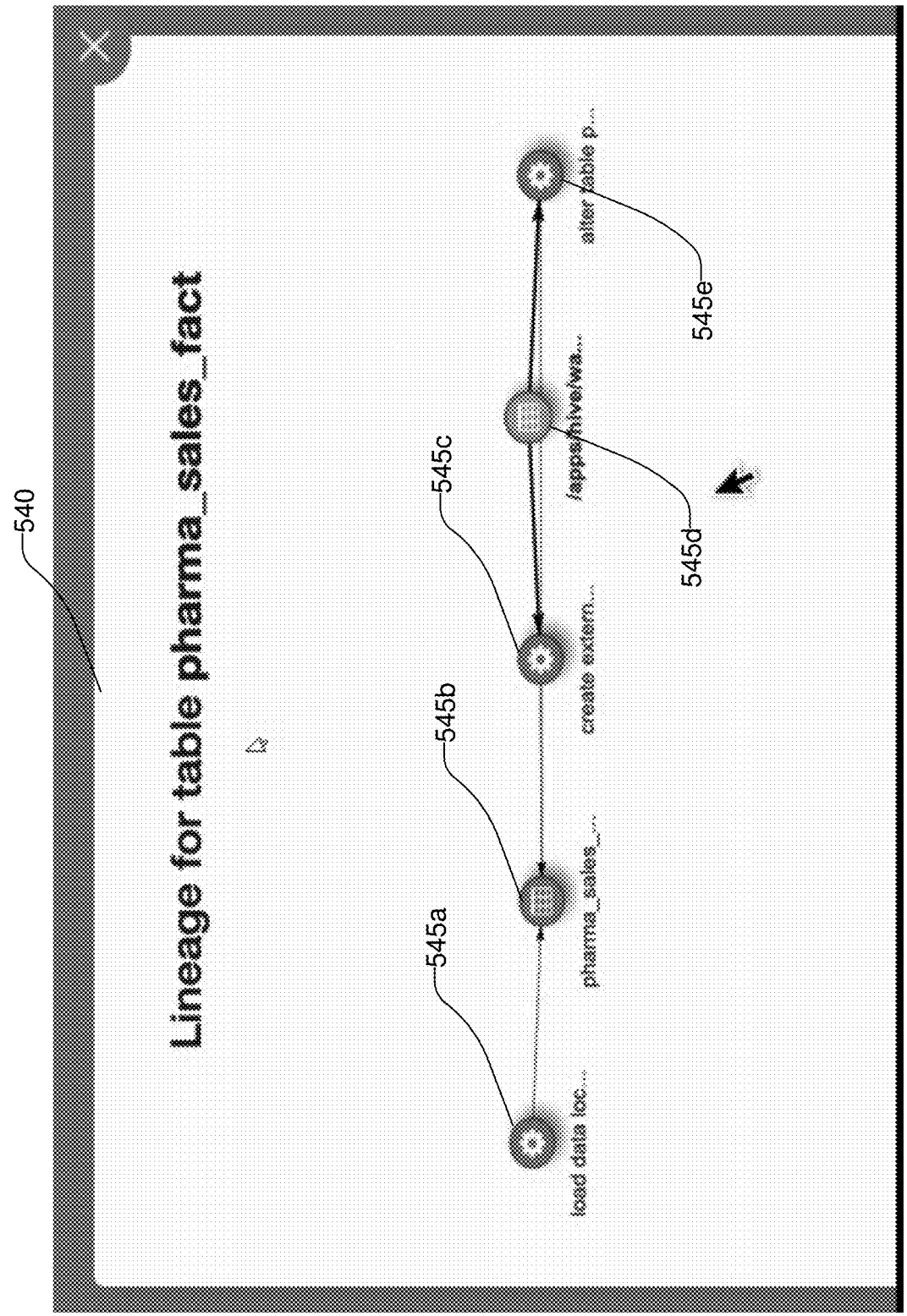
FIG. 5E shows a user interface for allowing a user to view lineage of data, according to an embodiment.

The system stores lineage of data assets representing information describing where the data stored in the data asset was obtained from. The analysis system shows the lineage via a user interface and allows users to inspect lineage of a data asset. FIG. 5E shows a user interface for allowing a user to view lineage of data, according to an embodiment. In an embodiment, the user interface 540 shows the lineage of a data asset as a data graph where each node 545a, 545b, 545c, 545d, 545e represents either an action performed to obtain data, for example, a load operation or a data source such as a file or a table from where the data was obtained. The lineage graph shown in the user interface allows a user to track the original of a data, thereby determining whether the data was obtained from a reliable source, for example, whether the data was obtained from a source that conforms to certain privacy policy. The system allows a user to determine whether using data stored in a particular data asset will expose the user to certain liabilities, for example, if the data was obtained from a source that violated certain privacy policies.

Process for Executing Analysis Pipeline

Figure 6A:
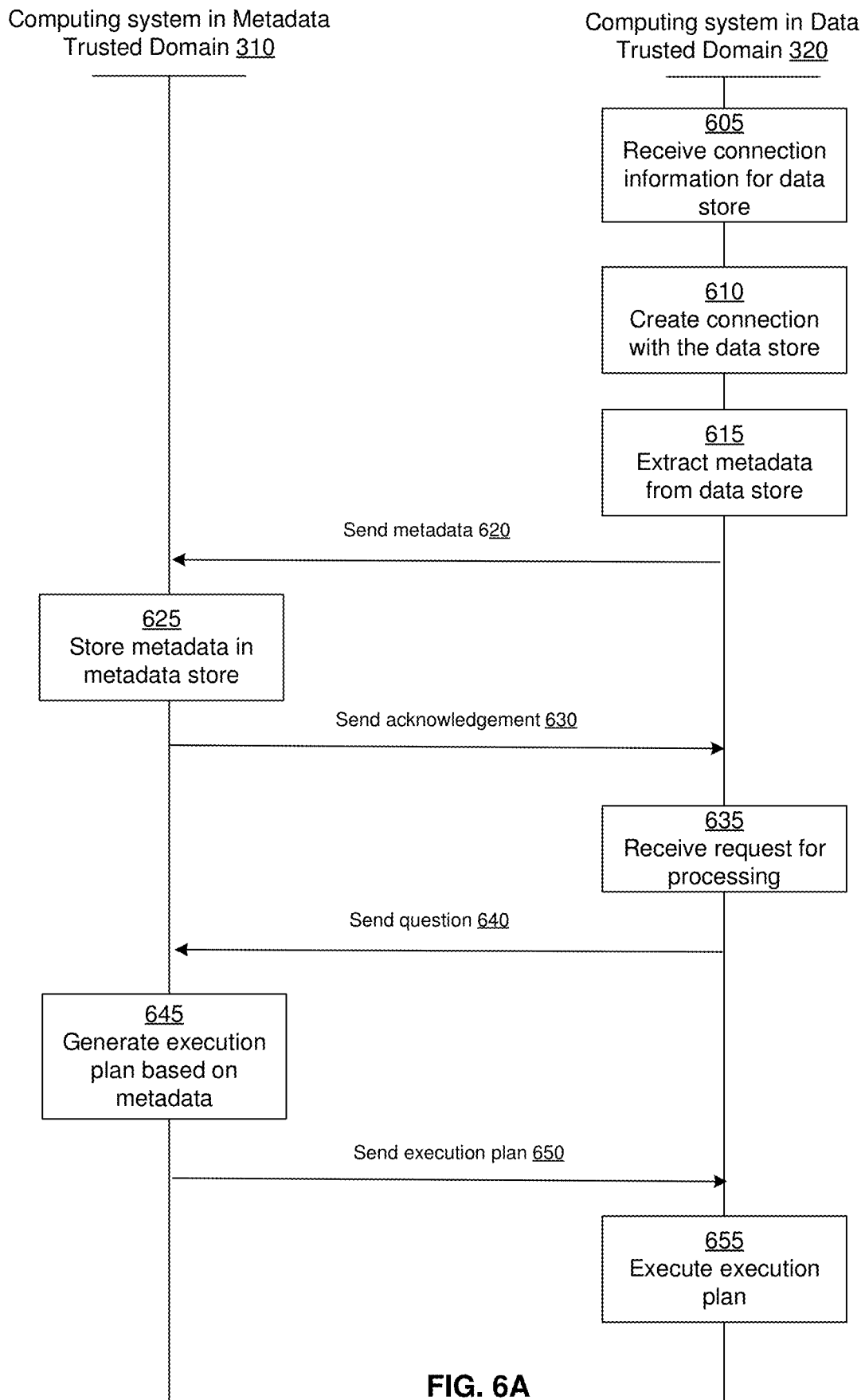
FIG. 6A illustrates the interactions between various systems executing the analysis pipeline according to an embodiment.

FIG. 6A illustrates the interactions between various applications executing the analysis pipeline according to an embodiment. An application may be a module executing on a computing system within a trusted domain. As shown in FIG. 2, the trusted domain 320 stores data of the enterprise and represents a data trusted domain whereas the trusted domain 310 stores metadata and represents a metadata trusted domain. A metadata trusted domain may also be referred to as a multi-tenant trusted domain and a data trusted domain may be referred to herein as a tenant trusted domain.

An application, for example, metadata crawler 210 executing on a computing system of the trusted domain 320 receives 605 connection information for connecting to data stores within the trusted domain. The application creates 610 a connection with the data store and analyzes the data stored in the data store to extract 615 metadata describing the data. The application sends 620 the metadata to a computing system of the trusted domain 310 for storing 625 in the metadata store 250 of a computing system of the trusted domain 310. The computing system of the metadata trusted domain that stores 625 the metadata in the metadata store 250 may send 630 an acknowledgement to a computing system of the trusted domain 320.

A computing system in the data trusted domain 320 receives 635 a request for processing the data stored in the data stores. The request may be a natural language question. In other embodiments the request may be received 635 by a computing system of the metadata trusted domain 310 that stores metadata. For example, the request may be received 635 by a user interface of an application that is configured by either a computing system of the trusted domain 310 or a computing system of the trusted domain 320. If the request is received 635 by a user interface of an application that is configured by a computing system of the trusted domain 320 as shown in FIG. 6, information describing the request is sent (forwarded) 640 to a computing system of the metadata trusted domain 310. For example, if the request represents a natural language question, the natural language question may be forwarded 640 to a computing system of the metadata trusted domain 310 executing the natural language processing module 225. The request may represent a query requesting lineage information for a portion of data stored in a data store. Accordingly, the request is forwarded 640 to a computing system of the metadata trusted domain 310 executing the lineage determination module 265.

The computing system of the trusted domain 310 that receives the request performs analysis using the metadata stored in the metadata store 250 to process the question. If the request can be processed based on the metadata only, without requiring access to the data stored in the data store 255 of the trusted domain 320, the computing system processes the request and provides the result to the requestor. However, some requests may further require access to the data stored in the data store 255 of the trusted domain 320. For such requests, the computing system 610 of the metadata trusted domain 310 generates 645 an execution plan based on the metadata. The computing system of the metadata trusted domain 310 sends 650 the execution plan to the computing system of the data trusted domain 320. The computing system 620 of the metadata trusted domain 320 executes 655 the execution plan to process the request and provides the result to the requestor. In the process illustrated in FIG. 6, the computing system 610 represents a set of computing systems of the metadata trusted domain 310 such that a step may be executed by any computing system of the set. Similarly, the computing system of the data trusted domain 320 represents a set of computing systems of the data trusted domain 320 such that a step may be executed by any computing system of the set.

Figure 6B:
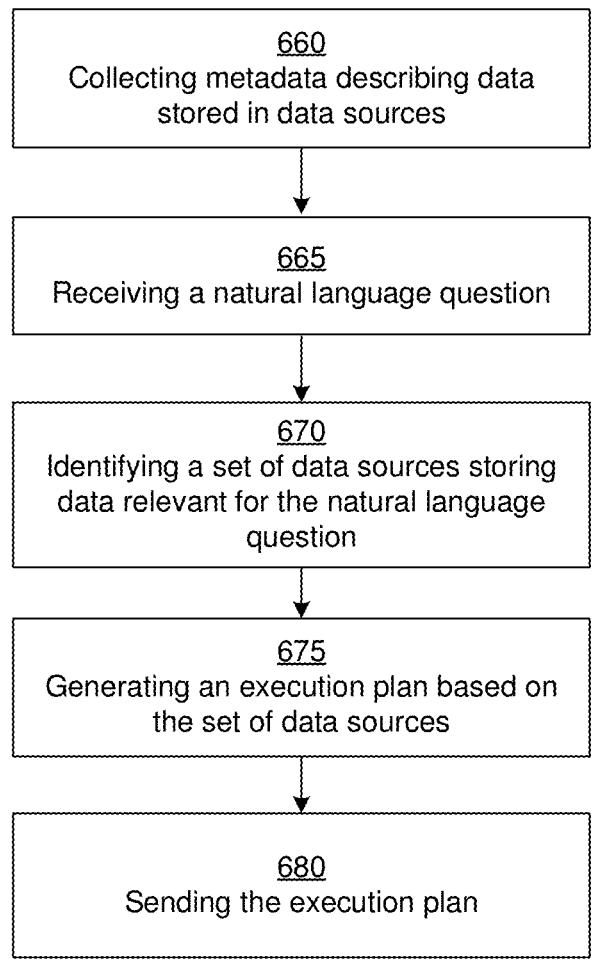
FIG. 6B shows a flowchart illustrating a process for executing questions across the multiple trusted domains according to an embodiment.

FIG. 6B shows a flowchart illustrating a process for executing questions across the multiple trusted domains according to an embodiment. The data trusted domain may be referred to herein as a tenant trusted domain and the metadata trusted domain may be referred to as the multi-tenant trusted domain. This is so because the metadata trusted domain may obtain metadata of multiple data trusted domain. Furthermore, the metadata trusted domain may act as a multi-tenant system that supports multiple tenants, each corresponding to a data trusted domain (or a tenant trusted domain). The various tenant trusted domains collect metadata and send to the multi-tenant trusted domain. Accordingly, all data is stored in the tenant trusted domains although the multi-tenant trusted domain obtains and stores metadata from multiple tenant trusted domain. Each multi-tenant trusted domain and the tenant trusted domain hosts multiple services that run on computing systems of the corresponding trusted domain. A data pipeline is formed by execution of a set of services from the multi-tenant trusted domain and a set of services from a tenant trusted domain.

The computing systems of the multi-tenant trusted domain collect 660 metadata describing data stored in data sources of a set of tenant trusted domains. The computing systems of the multi-tenant trusted domain collect metadata from tenant trusted domains as follows. For each tenant trusted domain, the computing systems of the multi-tenant trusted domain send to a computing system of the tenant trusted domain a request to perform data crawling. The computing systems of the tenant trusted domain perform data crawling to extract metadata describing data stored in the data sources of the tenant trusted domain and send the metadata extracted to the computing systems of the multi-tenant trusted domain. The computing systems of the multi-tenant trusted domain receive the metadata describing data stored in data sources of the tenant trusted domain.

A computing system of the multi-tenant trusted domain receives 665 a natural language question for processing using data stored in data sources of a particular tenant trusted domain. The question may be received by the computing system of the multi-tenant trusted domain directly from a client device of a user. Alternately, a computing system of the tenant trusted domain receives the natural language question and sends the question to a computing system of the multi-tenant trusted domain running a service for processing natural language questions.

The computing systems of the multi-tenant trusted domain identify 670 a set of data sources of the tenant trusted domain that are relevant for processing the natural language question. The computing systems of the multi-tenant trusted domain generate 675 an execution plan for answering the natural language question. The execution plan is generated based on the collected metadata. The computing systems of the multi-tenant trusted domain send 680 the execution plan to the computing systems of the tenant trusted domain. The computing systems of the tenant trusted domain execute the execution plan and send the result of executing the execution plan to the client device that sent the natural language question.

According to an embodiment, the computing systems of the multi-tenant trusted domain generate the execution plan as follows. The computing systems identify a set of data assets from the data sources determined to be relevant to the natural language question. For each for each of the set of data assets, the computing systems determine a quality score for the data assets. The quality score is indicative of a quality of data stored in the data assets. The computing systems of the multi-tenant trusted domain identify a subset of data assets from the set of data assets based on the quality scores and generate the execution plan based on the subset of data assets. According to an embodiment, computing systems of the multi-tenant trusted domain determine the quality score of a data asset by receiving a portion of the data of the data asset based on sampling of data of the data asset and analyzing the quality of the received portion of the data of the data asset.

According to an embodiment, the quality score of a data asset is inversely related to a percentage of nulls in the data asset. Accordingly, higher percentage of nulls in a data asset indicates that the data asset has low data quality. According to an embodiment, the quality score of a data asset is inversely related to a percentage of values in the data asset with data format errors. According to an embodiment, the quality score of a data asset is indicative of a degree of compliance of the data asset with particular regulations, for example, privacy regulations.

According to an embodiment, the computing systems of the multi-tenant trusted domain generate the execution plan as follows. The computing systems of the multi-tenant trusted domain generate a virtual data model from the natural language question. The virtual data model comprises one or more entities. The computing systems match metadata of the data sources with the virtual data model. For each entity of the virtual data model, the computing systems determine a set of fields matching the entity from the data sources of the tenant trusted domain. The computing systems generate an execution plan comprising instructions for accessing the data for the virtual data model from the plurality of data sources based on the received selections of fields.

According to an embodiment, the computing systems of the multi-tenant trusted domain match metadata of the data sources with the virtual data model by matching table names of the data source with entity names of the virtual data model, or matching names of a set of columns of a table of the data source with names of a set of fields of an entity of the virtual data model.

According to an embodiment, the virtual data model comprises a relationship between a first entity and a second entity. If the system determines that a first set of fields of the first entity are mapped to a first set of fields from a first data source and a second set of fields of the second entity are mapped to a second set of fields of a second data source, the system generates instructions for creating a relationship table mapping data from the first set of fields from the first data source to the second set of fields of the second data source.

According to an embodiment, the virtual data model comprises one or more relationships. Each relationship relates a pair of entities of the virtual data model. If the system determines that a first set of fields of a particular entity of the data model are mapped to a first set of fields from a first data source and a second set of fields of the particular entity of the data model are mapped to a second set of fields of a second data source, the system generates instructions for creating a relationship table mapping data from the first set of fields from the first data source to the second set of fields of the second data source.

According to an embodiment, the computing systems of the multi-tenant trusted domain generate the execution plan as follows. The computing systems identify from the plurality of data sources, a plurality of data assets determined to store data relevant for answering the natural language question. The computing systems determine a score for each of the plurality of data assets. The score is determined based on factors including a degree of match between the natural language question and metadata describing the data asset. The computing systems rank the plurality of data assets based on their scores and generate an execution plan using one or more data assets selected based on the ranking.

According to an embodiment, the score for a data asset is based on a number of field names of an entity of the virtual data model that match fields of the data asset. According to an embodiment, the score for the data asset is based on matching of data types of fields of the data asset and corresponding data types of fields of the entity. According to an embodiment, the score for the data asset is based on an amount of data stored in the data asset.

According to an embodiment, each data asset is associated with a set of stored questions previously received. The score for the data asset is determined based on a number of distinct stored questions for the data asset. According to an embodiment, the score for the data asset is determined based on a weighted aggregate of the stored questions for the data asset, wherein each stored question is weighted based on a number of times the stored question was invoked. According to an embodiment, each stored question is further weighted based on a degree of match between the stored question and the received question.

Following is the process of processing questions using stored questions, according to an embodiment. The process is executed in the computing systems of the multi-tenant trusted domain. The execution plan is generated and sent to the computing systems of the tenant trusted domain for executing using the data sources of the tenant trusted domain. The computing systems of the tenant trusted domain execute the execution plan and send the results to a client device of a user that provided the natural language question.

The analysis system takes natural language questions and converts them to instructions in languages that can be processed by systems, for example, SQL (structured query language). The analysis system 100 receives a question that may be a natural language question or a search request with one or more search keywords. The analysis system 100 stores previously received questions including natural language questions, structured language queries, and keyword based searches. These previously received and answered questions are referred to as the stored questions. The analysis system 100 identifies a set of stored questions matching the received question.

In an embodiment, the analysis system 100 determines a match score for each stored question that is determined to match the received question. For each matching question, the analysis system determines a match score based on number of fields/metadata/files/tables associated with the received question that match the fields/metadata/files/tables of the stored question. In an embodiment, the analysis system 100 performs semantic match of two input questions by comparing the natural language text of the two questions using a trained machine learning model, for example, using a neural network trained to received two natural language sentences as input and output a score indicating a degree of semantic match between the two input sentences. In an embodiment, the analysis system 100 matches two questions by generating a virtual data model for each input question and matching the two generated virtual data models. The virtual data models comprise an entity relationship graph and the analysis system 100 matches two virtual data models by matching their corresponding entity relationship graphs. In an embodiment, the analysis system 100 weighs each question based on the number of times the question was invoked in the past. A question Q1 is invoked if a user asks the question Q1 directly, or if a user asks a question Q2 that matches the question Q1, thereby executing the execution plan of the question Q1, or if a user asks a question Q3 such that the execution plan of question Q1 is executed to generate at least a portion of the answer of the question Q3.

In an embodiment, the analysis system ignores certain values of the natural language questions when comparing two natural language questions. The analysis system 100 determines values of the natural language question that correspond to parameters in the generated virtual data model. For example, analysis system 100 determines that certain values mentioned in the natural language question map to parameters specifying a range in a question. The analysis system 100 ignores these values while comparing the natural language questions. This is so because the analysis system 100 reuses the execution plan of a stored question by replacing the parameter values of the stored question with the parameter values of the received question. This allows the analysis system 100 to reuse the effort previously spent in analyzing the stored question and generating the execution plan for the stored question.

The analysis system 100 ranks the matching stored questions based on the match score. The analysis system sends for display via a UI, one or more questions based on the ranking. In an embodiment, the analysis system 100 selects the highest-ranking question as the matching question and recommends it as the stored question that can be executed instead of the received question. If the user approves the recommendation, the analysis system 100 executes the approved stored question instead of the received question. In an embodiment, the analysis system 100 presents the execution plan of the matching stored question to the user and lets the user modify it before execution. For example, the user may modify the values of a range or values of certain parameters before execution.

In an embodiment, the analysis system 100 presents a user interface that presents a list of matching stored questions as the user inputs the new question. For example, the list of matching stored questions is presented in a drop-down list. The user may select a matching stored question without typing the entire new question. The analysis system 100 receives the user selection and presents the stored question in a user interface. The user interface is configured to allow the user to modify the stored question, for example, to change certain parameters. The analysis system 100 receives the modified question and updates the execution plan based on the modifications to the question. For example, the analysis system 100 replaces the parameter values of the execution plan obtained from the stored question with the corresponding parameter values of the execution plan from the modified question.

In an embodiment, the analysis system 100 generates a set of instructions for processing the data from the data sources to answer the questions. The analysis system 100 sends the set of instructions either for display (e.g., via email), or for execution. The instructions may include: (1) instructions to extract data from a data source, (2) instructions to transform data to match formats across data sources, or (3) instructions to combine (join) data from different data sources to generate new tables.

Figure 7A:
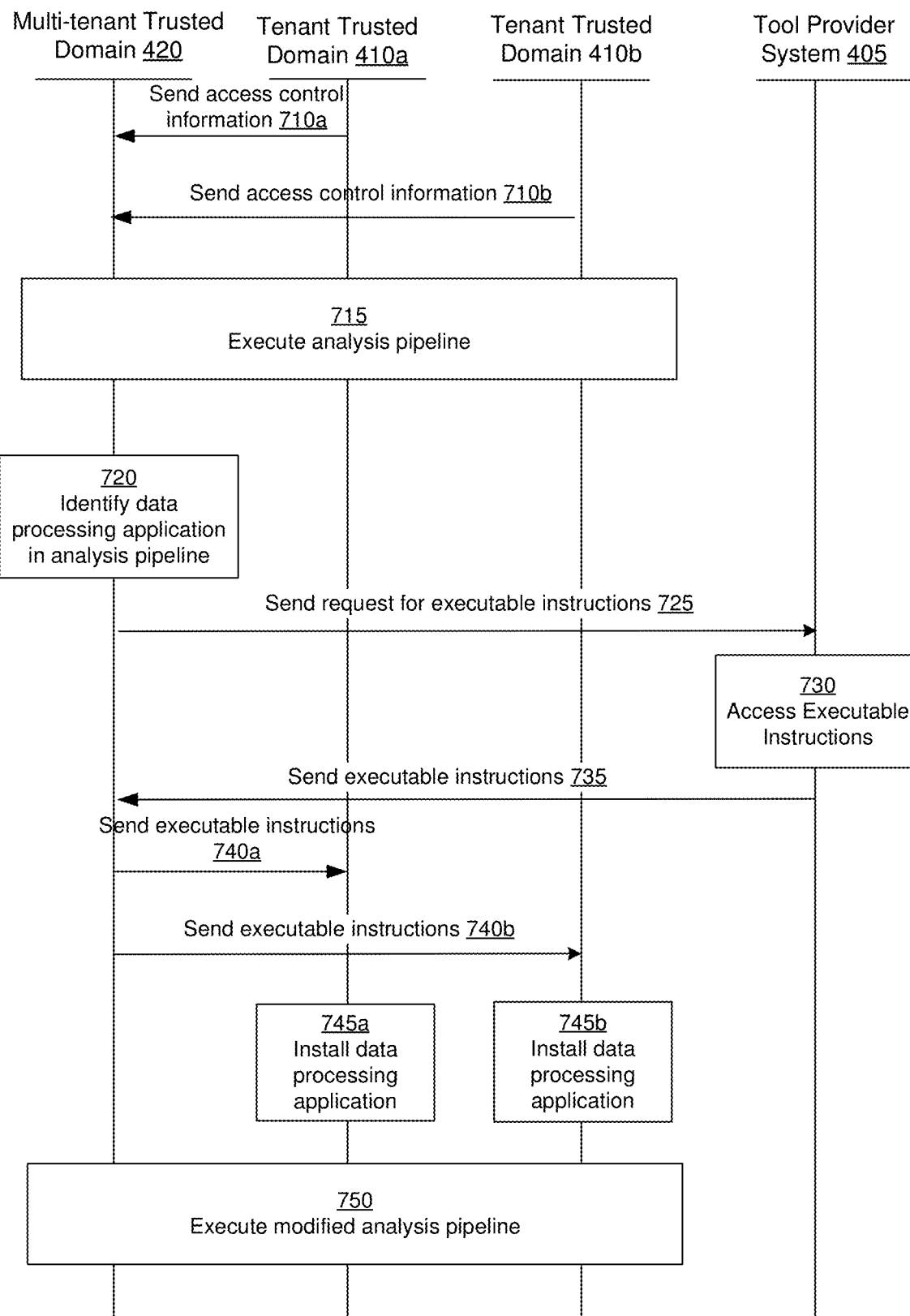
FIG. 7A-B illustrate the interactions between various systems executing the analysis pipeline in a multi-tenant system according to various embodiments.
Figure 7B:
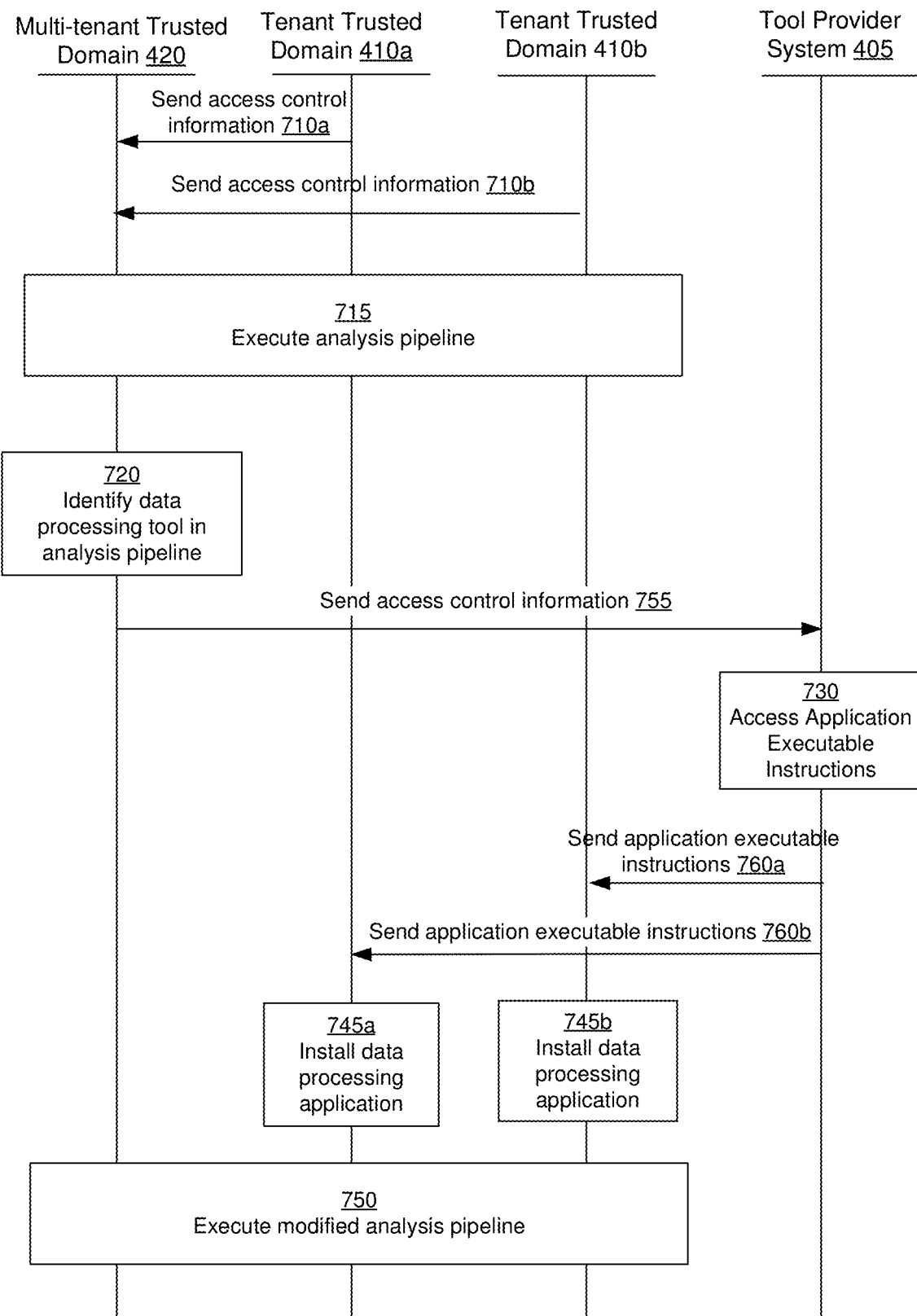

FIG. 7A-B illustrate the interactions between various systems executing the analysis pipeline in a multi-tenant system according to various embodiments. As shown in FIG. 7, a computing system in a multi-tenant trusted domain 420 interacts with computing systems in a plurality of tenant trusted domains 410a, 410b and further interacts with a tool provider system 405 to modify the analysis pipeline. The tenant trusted domains 410a, 410b send 710a, 710b access control information (e.g., credentials) to the multi-tenant system that allows a computing system in the multi-tenant trusted domain 420 to install applications or modify installations of application in computing systems of the tenant trusted domain 410. The access control does not allow the computing system in the multi-tenant trusted domain 420 to access data stored in data stores of the computing systems of the tenant trusted domain 410. The computing systems of the multi-tenant trusted domain 420 and the tenant trusted domains 410a, 410b execute 715 the analysis pipeline, for example, as illustrated in FIG. 6.

The computing system of the multi-tenant trusted domain 420 identifies 720 a data processing application associated with the analysis pipeline. The identified 720 data processing application may be an existing data processing application of the analysis pipeline that needs an upgrade. The identified 720 data processing application may be an existing data processing application of the analysis pipeline that is planned to be replaced with another data processing application that provides equivalent functionality. The identified 720 data processing application may be a new data processing application that is planned to be added to the analysis pipeline.

The computing system of the multi-tenant trusted domain 420 sends 725 to a tool provider system 405, a request for executable instructions 725 for the identified data processing application. A computing system of the tool provider system 405 accesses 730 the executable instructions for the identified data processing application. The tool provider system 405 sends 735 the executable instructions for the identified data processing application to the computing system of the multi-tenant trusted domain 420. The multi-tenant trusted domain 420 sends 740a, 740b the executable instructions of the identified data processing application to the tenant trusted domains 410a, 410b. The respective computing systems of the tenant trusted domains 410a, 410b install 745a, 745b the data processing application using the received executable instructions, for example, by either installing a new data processing application for adding to the analysis pipeline, or by upgrading an existing data processing application, or by replacing an existing data processing application with a new data processing application. The computing systems of the multi-tenant trusted domain 420 and the tenant trusted domains 410a, 410b execute 750 the modified analysis pipeline.

Figure 8:
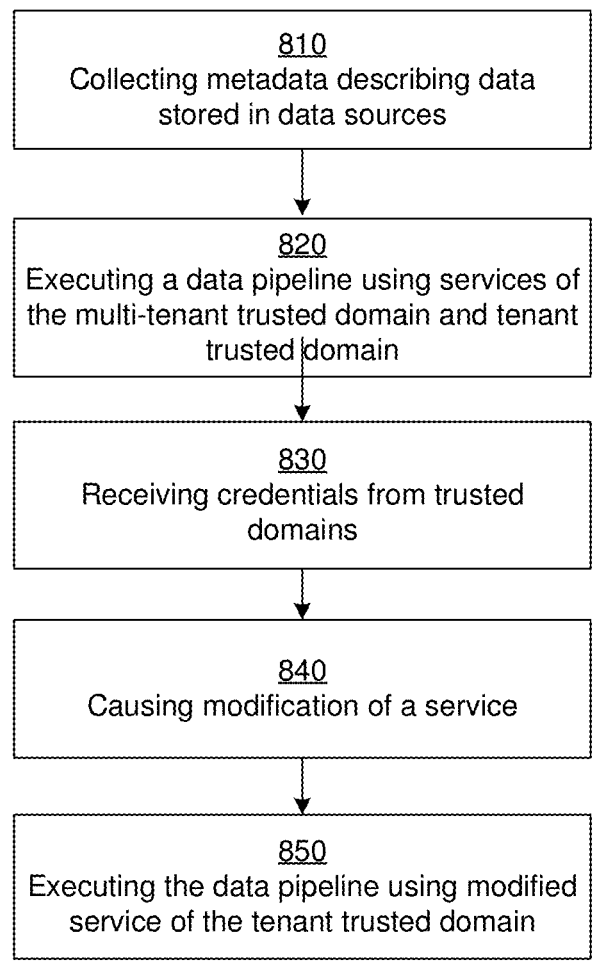
FIG. 8 shows a flowchart illustrating the process of modifying services of a data pipeline executed across trusted domains, according to an embodiment.

FIG. 8 shows a flowchart illustrating the process of modifying services of a data pipeline executed across trusted domains, according to an embodiment. One or more computing systems of a multi-tenant trusted domain collect 810 metadata describing data stored in data sources of a plurality of tenant trusted domains. The step 810 is similar to step 660 of the process illustrated in FIG. 6B. The computing systems of the multi-tenant trusted domain host a set S1 of services for processing metadata received from a tenant trusted domain. The services from the set S1 of services interact with a set S2 of services hosted by each of the plurality of tenant trusted domain. The set S2 of services process the data stored in data sources of the tenant trusted domain.

The system executes 820 a data pipeline using (1) services of the set S1 of services of the multi-tenant trusted domain and (2) services of the set S2 of services of a particular tenant trusted domain. The services of the set S1 of services process metadata obtained from the particular tenant trusted domain. The services from the set S2 of services of the particular tenant trusted domain process data stored in data sources of the particular tenant trusted domain. The separation of the services of the data pipeline across the multi-tenant trusted domain and the tenant trusted domain ensures that data of the data sources of the tenant trusted domain is not transmitted outside the tenant trusted domain to execute the data pipeline. Only metadata and information describing the data sources is transmitted to the multi-tenant trusted domain. This allows sensitive data to be stored securely within the boundary of a tenant trusted domain.

For each of the plurality of tenant trusted domains, the computing systems of the multi-tenant trusted domain receive 830 credentials for interacting with one or more computing systems of the tenant trusted domain. The credentials provide access for modifying services from the second set of services of the tenant trusted domain. The credentials do not allow an external system that is not part of the tenant trusted domain to access the data sources. For example, the tenant trusted domain may use separate computing systems for executing the services of set S2 compared to the computing systems used for storing the data of the data sources. The credentials for accessing the computing systems running the services of set S2 are not allowed to access the data stored in the data sources. Other mechanisms may be used to ensure that the data of the data sources is not accessible via the credentials provided to the multi-tenant trusted domain. However, the credential may be used to make modifications to the services of the set S2, for example, by reconfiguring the services, modifying the executable instructions of the services of the set S2 by installing new code. For example, the credentials have the access to the computing systems so that the credentials may be used to stop or start the services of set S2, install new software artifacts (e.g., new libraries with newer versions of the services).

For each of the plurality of tenant trusted domains, the computing systems of the multi-tenant trusted domain cause 840 modification of a particular service of the second set of services using the credentials obtained from the tenant trusted domain. The modification may be performed by installation of executable instructions for the particular service or by reconfiguring particular service. In some embodiments, the modification causes the executable instructions of a service to be replaced with a new set of executable instructions. For example, a service installed using software artifacts provided by a software provider P1 may be replaced with software artifacts provided by a different software provider P2. In some embodiments, the data pipeline may be modified by adding a new service to the data pipeline. For example, the new service may allow users to perform a new functionality that was not available using the previous data pipeline. The system ensures that the new service is able to receive as input, data generated by a service of the data pipeline and if necessary, provide results to a service of the data pipeline. This allows the service to be inserted in the data pipeline, thereby extending the data pipeline. According to an embodiment, the modification to the data pipeline removes a service from the data pipeline. For example, if the output of service S1 is provided to service S2 and the output of service S2 is provided to service S3 in the original data pipeline, the data pipeline may be modified by eliminating the service S2 from the data pipeline. Accordingly, the modified data pipeline includes only S1 and S3 such that the output of service S1 is provided to service S3 directly.

The system executes 850 the modified data pipeline using (1) services of the set S1 of services of the multi-tenant trusted domain and (2) services of the second set of services of the particular tenant trusted domain including the modified particular service.

According to an embodiment, the computing systems of the tenant trusted domain cause modification of a particular service of the second set of services using the credentials obtained from the tenant trusted domain is performed by sending the credentials received from the tenant trusted domain to a provider system. The provider system uses the credentials to send executable instructions for the particular service to the computer system of the tenant trusted domain.

According to an embodiment, the computing systems of the tenant trusted domain cause modification of a particular service of the second set of services using the credentials obtained from the tenant trusted domain is performed by receiving executable instructions for the particular service from a provider system and using the credentials received from the tenant trusted domain to send executable instructions for the particular service to the computer system of the tenant trusted domain for installation.

According to an embodiment, collecting metadata describing data stored in data sources of the plurality of tenant trusted domains is performed as follows. For each tenant trusted domain, the computing systems of the multi-tenant trusted domain send a request to perform data crawling to a computing system of the tenant trusted domain. The computing systems of the multi-tenant trusted domain receive metadata describing data stored in data sources of the tenant trusted domain.

Processes for Performing Analysis

The analysis pipeline is used to perform various types of analysis using the computing systems across multiple trusted domains as illustrated in FIGS. 6-7. The trusted domain that has access to the data is referred to as the data trusted domain and the trusted domain that has access to the metadata without access to the data is referred to as the metadata trusted domain. The computing systems executing the analysis pipeline collectively are referred to as an analysis system. A computing system of the data trusted domain receives connection information for one or more data sources. The connection information may include an address and port number for establishing a connection with a data source system. The connection information may also include login information, for example, user name and password for connecting to a data source system. The computing system of the data trusted domain creates a connection with the data source system. The computing system of the data trusted domain extracts metadata describing the data stored in the data source of the data source system using the connection created with the data source system and provides the metadata to a computing system of the metadata trusted domain for storing in the metadata store.

The computing system of the metadata trusted domain uses metadata to create a dynamic mapping to an entity relationship diagram based off of the data model that represents a live view of the data sources. The computing system of the metadata trusted domain creates step-by-step directions of how to find the data, how to access the data and assemble the data to construct the data model.

The metadata received by the computing system of the metadata trusted domain may include names of tables, files, or any named unit of data storage of the data source. The named units of data storage store collections of records or rows of data. The metadata further comprises fields for each table. A field of a table may also be referred to as a column of the table. The metadata may further comprise information describing the data source, for example, data types of each field, statistics describing the table (e.g., size of the table), and so on.

The analysis system receives questions, for example, natural language questions from users. The analysis system processes the questions using the metadata obtained from the data sources. In an embodiment, the computing system of the metadata trusted domain receives one or more data models from one or more third party systems and stores the accessed data models in the data model store. In an embodiment, the computing system of the metadata trusted domain generates virtual data models based on the received questions and stores the virtual data models in connection with the question corresponding to the virtual data model. The computing system of the metadata trusted domain may compare a new question received from a user against the stored data models including stored virtual data models of previous questions to determine if any of the stored data model either answers the new question or provides at least a portion of answer to the new question, for example, a partial result that can be further processed to answer the question.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   collecting by one or more computing systems of a multi-tenant trusted domain, metadata describing data stored in data sources of a set of tenant trusted domains, the collecting comprising, for each tenant trusted domain:
      sending a request to perform data crawling to a computing system of the tenant trusted domain, and
      receiving by the one or more computing systems of the multi-tenant trusted domain, metadata describing data stored in one or more data sources of the tenant trusted domain;
   receiving by the one or more computing systems of the multi-tenant trusted domain, a natural language question for processing using data stored in data sources of a tenant trusted domain;
   identifying by the one or more computing systems of the multi-tenant trusted domain, a set of data sources of the tenant trusted domain that are relevant for processing the natural language question;
   generating by the one or more computing systems of the multi-tenant trusted domain, an execution plan for answering the natural language question, the execution plan generated based on the collected metadata; and
   sending by the one or more computing systems of the multi-tenant trusted domain, the execution plan to the one or more computing systems of the tenant trusted domain, wherein the one or more computing systems of the tenant trusted domain execute the execution plan and send a result of executing the execution plan to a client device that sent the natural language question.

2. The computer-implemented method of claim 1, wherein generating the execution plan comprises:
identify a set of data assets from the one or more data sources, wherein the set of data assets store information relevant for answering the natural language question;
for each of the set of data assets, determining a quality score for the data asset, the quality score indicative of a quality of data stored in the data asset;
identifying a subset of data assets from the set of data assets based on the quality scores;
generating the execution plan based on the subset of data assets.

3. The computer-implemented method of claim 2, wherein determining the quality score of the data asset comprises:
receiving at least a portion of the data of the data asset based on sampling of data of the data asset; and
analyzing the quality of the received portion of the data of the data asset.

4. The computer-implemented method of claim 2, wherein the quality score of the data asset is inversely related to a percentage of nulls in the data asset.

5. The computer-implemented method of claim 2, wherein the quality score of the data asset is inversely related to a percentage of values in the data asset with data format errors.

6. The computer-implemented method of claim 2, wherein the quality score of the data asset is indicative of a degree of compliance of the data asset with particular regulations.

7. The computer-implemented method of claim 2, wherein the quality score of the data asset is indicative of a degree of compliance of the data asset with privacy regulations.

8. The computer-implemented method of claim 1, wherein generating the execution plan comprises:
generating a virtual data model from the natural language question, the virtual data model comprising one or more entities;
matching metadata of the one or more data sources with the virtual data model;
for each of one or more entities from the virtual data model, determining a set of fields matching the entity from the data sources of the tenant trusted domain,
generating an execution plan comprising instructions for accessing the data for the virtual data model from the one or more data sources.

9. The computer-implemented method of claim 8, wherein matching metadata of the one or more data sources with the virtual data model comprises:
matching table names of the data source with entity names of the virtual data model, and
matching names of a set of columns of a table of the data source with names of a set of fields of an entity of the virtual data model.

10. The computer-implemented method of claim 8, wherein the virtual data model comprises a relationship between a first entity and a second entity, wherein responsive to determining that a first set of fields of the first entity are mapped to a first set of fields from a first data source and a second set of fields of the second entity are mapped to a second set of fields of a second data source, the method comprising:
generating instructions for creating a relationship table mapping data from the first set of fields from the first data source to the second set of fields of the second data source.

11. The computer-implemented method of claim 8, wherein the virtual data model comprises one or more relationships, each relationship relating a pair of entities of the virtual data model, wherein responsive to determining that a first set of fields of a particular entity of the data model are mapped to a first set of fields from a first data source and a second set of fields of the particular entity of the data model are mapped to a second set of fields of a second data source, the method comprising:
generating instructions for creating a relationship table mapping data from the first set of fields from the first data source to the second set of fields of the second data source.

12. The computer-implemented method of claim 1, wherein generating the execution plan comprises:
identifying from the one or more data sources, a plurality of data assets determined to store data relevant for answering the natural language question;
determining a score for each of the plurality of data assets, the score determined based on factors comprising, a degree of match between the natural language question and metadata describing the data asset;
ranking the plurality of data assets based on their scores; and
generating an execution plan using a data asset selected based on the ranking.

13. The computer-implemented method of claim 12, wherein each data asset is associated with a set of stored questions previously received, wherein the score for the data asset is determined based on a number of distinct stored questions for the data asset.

14. The computer-implemented method of claim 12, wherein each data asset is associated with a set of stored questions previously received, wherein the score for the data asset is determined based on a weighted aggregate of the stored questions for the data asset, wherein each stored question is weighted based on a number of times the stored question was invoked.

15. The computer-implemented method of claim 14, wherein each stored question is further weighted based on a degree of match between the stored question and the received question.

16. The computer-implemented method of claim 12, further comprising:
generating a virtual data model from the natural language question, the virtual data model comprising one or more entities, wherein the score for the data asset is based on a number of field names of an entity of the virtual data model that match fields of the data asset.

17. The computer-implemented method of claim 16, wherein the score for the data asset is based on matching of data types of fields of the data asset and corresponding data types of fields of the entity.

18. The computer-implemented method of claim 12, wherein the score for the data asset is based on an amount of data stored in the data asset.

19. A non-transitory computer-readable storage medium storing computer-executable code for executing on one or more computer processors, the code comprising instructions that when executed, cause the one or more computer processors to perform steps comprising:
collecting by one or more computing systems of a multi-tenant trusted domain, metadata describing data stored in data sources of a set of tenant trusted domains, the collecting comprising, for each tenant trusted domain:
sending a request to perform data crawling to a computing system of the tenant trusted domain, and
receiving by the one or more computing systems of the multi-tenant trusted domain, metadata describing data stored in one or more data sources of the tenant trusted domain;
receiving by the one or more computing systems of the multi-tenant trusted domain, a natural language question for processing using data stored in data sources of a tenant trusted domain;
identifying by the one or more computing systems of the multi-tenant trusted domain, a set of data sources of the tenant trusted domain that are relevant for processing the natural language question;
generating by the one or more computing systems of the multi-tenant trusted domain, an execution plan for answering the natural language question, the execution plan generated based on the collected metadata; and
sending by the one or more computing systems of the multi-tenant trusted domain, the execution plan to the one or more computing systems of the tenant trusted domain, wherein the one or more computing systems of the tenant trusted domain execute the execution plan and send a result of executing the execution plan to a client device that sent the natural language question.

20. A computer-implemented system for creating a virtual database, the system comprising:
a computer processor; and
a non-transitory computer-readable storage medium storing computer-executable code for executing on one or more computer processors, the code comprising instructions that when executed, cause the one or more computer processors to perform steps comprising:
collecting by one or more computing systems of a multi-tenant trusted domain, metadata describing data stored in data sources of a set of tenant trusted domains, the collecting comprising, for each tenant trusted domain:
sending a request to perform data crawling to a computing system of the tenant trusted domain, and
receiving by the one or more computing systems of the multi-tenant trusted domain, metadata describing data stored in one or more data sources of the tenant trusted domain;
receiving by the one or more computing systems of the multi-tenant trusted domain, a natural language question for processing using data stored in data sources of a tenant trusted domain;
identifying by the one or more computing systems of the multi-tenant trusted domain, a set of data sources of the tenant trusted domain that are relevant for processing the natural language question;
generating by the one or more computing systems of the multi-tenant trusted domain, an execution plan for answering the natural language question, the execution plan generated based on the collected metadata; and
sending by the one or more computing systems of the multi-tenant trusted domain, the execution plan to the one or more computing systems of the tenant trusted domain, wherein the one or more computing systems of the tenant trusted domain execute the execution plan and send a result of executing the execution plan to a client device that sent the natural language question.

\* \* \* \* \*